(12) United States Patent
Okamoto

(10) Patent No.: US 11,781,047 B2
(45) Date of Patent: *Oct. 10, 2023

(54) ADHESION METHOD EMPLOYING POLYMER MICROPARTICLE-CONTAINING CURABLE RESIN COMPOSITION HAVING EXCELLENT WORKABILITY, AND LAMINATE OBTAINED USING SAID ADHESION METHOD

(71) Applicant: KANEKA CORPORATION, Osaka (JP)

(72) Inventor: Toshihiko Okamoto, Hyogo (JP)

(73) Assignee: KANEKA CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/831,690

(22) Filed: Jun. 3, 2022

(65) Prior Publication Data

US 2022/0290018 A1    Sep. 15, 2022

Related U.S. Application Data

(63) Continuation of application No. 17/080,422, filed on Oct. 26, 2020, now Pat. No. 11,384,267, which is a continuation of application No. PCT/JP2019/017243, filed on Apr. 23, 2019.

(30) Foreign Application Priority Data

Apr. 27, 2018  (JP) .................................. 2018-087142
Apr. 27, 2018  (JP) .................................. 2018-087143

(51) Int. Cl.
| | | |
|---|---|---|
| *C09J 163/00* | (2006.01) | |
| *C09J 5/06* | (2006.01) | |
| *C09J 11/08* | (2006.01) | |

(52) U.S. Cl.
CPC ............... *C09J 163/00* (2013.01); *C09J 5/06* (2013.01); *C09J 11/08* (2013.01)

(58) Field of Classification Search
CPC ............. C09J 163/00; C09J 5/06; C09J 11/08
See application file for complete search history.

(56) References Cited

U.S. PATENT DOCUMENTS

| | | | |
|---|---|---|---|
| 11,384,267 B2 * | 7/2022 | Okamoto ................ | B32B 21/08 |
| 2010/0204404 A1 | 8/2010 | Hongo | |
| 2016/0244603 A1 | 8/2016 | Okamoto | |
| 2016/0272750 A1 | 9/2016 | Voci et al. | |
| 2017/0369629 A1 | 12/2017 | Mashima et al. | |
| 2018/0094176 A1 | 4/2018 | Okamoto et al. | |
| 2021/0277294 A1 | 9/2021 | Makino et al. | |

FOREIGN PATENT DOCUMENTS

| | | | | |
|---|---|---|---|---|
| CN | 104768991 A | 7/2015 | | |
| CN | 105683238 A | 6/2016 | | |
| EP | 3281965 A1 | 2/2018 | | |
| JP | 103162476 A | 7/1991 | | |
| JP | 2002294207 A | 10/2002 | | |
| JP | 2003238650 A | 8/2003 | | |
| JP | 2016/199673 A | 12/2016 | | |
| JP | 2016199739 A | 12/2016 | | |
| JP | 2017132953 A | 8/2017 | | |
| JP | 2018002766 A | 1/2018 | | |
| WO | WO-2006132093 A1 * | 12/2006 | ............. | C08G 18/10 |
| WO | 2009034966 A1 | 3/2009 | | |
| WO | 2016159223 A1 | 10/2016 | | |
| WO | 2016159224 A1 | 10/2016 | | |
| WO | 2016163491 A1 | 10/2016 | | |
| WO | WO-2016159224 A1 * | 10/2016 | ............. | C08G 59/18 |
| WO | 2018008741 A1 | 1/2018 | | |
| WO | 2018/029311 A1 | 2/2018 | | |

OTHER PUBLICATIONS

International Search Report issued for PCT/JP2019/017243, dated Jul. 16, 2019 (1 page).
International Preliminary Report on Patentability for PCT/JP2019/017243, dated Nov. 5, 2020 (7 pages).
Extended European Search Report issued in corresponding European Patent Application No. EP 19792158.8 dated Dec. 17, 2021 (6 pages).
Office Action issued in corresponding Chinese Patent Application No. 201980028526.1 dated Dec. 14, 2021 (14 pages).
Office Action issued in corresponding Japanese Patent Application No. 2019-081967, dated Dec. 13, 2022, with translation (9 pages).

* cited by examiner

*Primary Examiner* — Daniel McNally
(74) *Attorney, Agent, or Firm* — Osha Bergman Watanabe & Burton LLP

(57) ABSTRACT

A method of adhesion provides excellent workability by using a curable resin composition whose viscosity has low temperature dependence. The method of adhesion includes a step of heating a curable resin composition and applying a curable resin composition, a step of spreading the curable resin composition, and a step of curing the curable resin composition. The curable resin composition contains specific amounts of an epoxy resin, fine polymer particles that have a core-shell structure including a core layer and a shell layer, and blocked urethane having a latent NCO % of 0.1% to 2.9%.

13 Claims, No Drawings

ADHESION METHOD EMPLOYING POLYMER MICROPARTICLE-CONTAINING CURABLE RESIN COMPOSITION HAVING EXCELLENT WORKABILITY, AND LAMINATE OBTAINED USING SAID ADHESION METHOD

TECHNICAL FIELD

One or more embodiments of the present invention relate to a curable resin composition which contains epoxy resin as a main component and which has excellent workability.

BACKGROUND

A cured product of an epoxy resin is excellent in many aspects, such as dimensional stability, mechanical strength, electrical insulation properties, heat resistance, water resistance, and chemical resistance. However, a cured product of epoxy resin has low fracture toughness and is very brittle. These properties often become problematic when using a cured product of epoxy resin in a wide range of applications.

Patent Literature 1 discloses techniques for dispersing fine polymer particles, having a core-shell structure, into a curable resin composition containing a curable resin such as epoxy resin as a main component.

Patent Literatures 2, 3, and 4 disclose techniques which combine (i) fine polymer particles having a core-shell structure and (ii) blocked urethane serving as reinforcing agent other than the fine core-shell polymer particles with (iii) a curable resin composition containing epoxy resin as a main component.

A curable resin composition in liquid form which contains epoxy resin as a main component typically has low viscosity when temperatures are high, such as during the summer, and markedly increased viscosity when temperatures are low, such as during the winter. Thus, the viscosity of the curable resin composition is temperature dependent.

It is known that, generally, for an adhesive agent containing epoxy resin as a main component, employing a thin adhesive layer thereof results in greater adhesive strength, such as shear adhesiveness and peeling adhesiveness. As such, after the adhesive agent is applied to a first adherend, e.g. a spatula is used to spread the adhesive agent thinly.

As disclosed in Patent Literature 5, in known art there is a heat-and-apply type epoxy-based adhesive agent that exhibits sufficient applicability when heated.

PATENT LITERATURE

[Patent Literature 1]
WO 2009/034966
[Patent Literature 2]
WO 2016/159223
[Patent Literature 3]
WO 2016/159224
[Patent Literature 4]
WO 2016/163491
[Patent Literature 5]
Japanese Patent Application Publication Tokukai No. 2017-132953

However, conventional techniques such as those above have room for further improvement in terms of (i) the temperature dependence of the viscosity of the curable resin composition and (ii) the workability provided by an adhesion method using the curable resin composition.

SUMMARY

One or more embodiments of the present invention were accomplished in view of the above circumstances. One or more embodiments of the present invention are to provide an adhesion method that provides excellent workability by using a curable resin composition whose viscosity has low temperature dependence. One or more embodiments of the present invention are to provide (i) a laminate obtained by the adhesion method and (ii) a method of producing the laminate.

As a result of diligent research, the inventor of the present invention completed one or more embodiments of the present invention after discovering that it was possible to solve the problem by a method of adhesion that utilizes a curable resin composition containing: an epoxy resin (A), fine polymer particles (B) that have a core-shell structure having a core layer and a shell layer, the shell layer having a cyano group; and blocked urethane (C), in which method the ratio of the mass of the fine polymer particles (B) to the mass of the blocked urethane (C) is set so as to fall within a specific range and the fine polymer particles (B) are selected such that there is a specific contained amount of the cyano group in the shell layer.

A method of adhesion in accordance with one or more embodiments of the present invention includes: (i) a step 1 of heating a curable resin composition to a first temperature and applying the curable resin composition to a first adherend so as to have a first thickness; (ii) a step 2 of spreading, to a second thickness, the curable resin composition that has been applied, the spreading being performed in an environment at a second temperature, the spreading being performed prior to or simultaneously with affixing a second adherend to the first adherend; and (iii) a step 3 of curing the curable resin composition sandwiched between the two adherends that have been affixed to each other, the first temperature being higher than the second temperature, and the second thickness being less than the first thickness, the curable resin composition containing: an epoxy resin (A); fine polymer particles (B) that have a core-shell structure including a core layer and a shell layer, the shell layer having a cyano group; and blocked urethane (C), the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A), a ratio (W1/W2) of a mass (W1) of the fine polymer particles (B) to a mass (W2) of the blocked urethane (C) being 0.1 to 10.0; a contained amount of the cyano group with respect to the total mass of the shell layer of the fine polymer particles (B) being 5.0 mmol/g to 10.0 mmol/g.

A method of adhesion in accordance with one or more embodiments of the present invention includes: (i) a step 1 of heating a curable resin composition to a temperature higher than a first room temperature and applying the curable resin composition to a first adherend so as to have a first thickness; (ii) a step 2 of spreading, to a second thickness, the curable resin composition that has been applied, the spreading being performed in an environment at a second room temperature, the spreading being performed prior to or simultaneously with affixing a second adherend to the first adherend; and (iii) a step 3 of curing the curable resin composition sandwiched between the two adherends that have been affixed to each other, the second thickness being less than the first thickness, the curable resin composition containing: an epoxy resin (A); fine polymer particles (B) that have a core-shell structure including a core layer and a shell layer, the shell layer having a cyano group; and blocked urethane (C), the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A), a ratio (W1/W2) of a mass (W1) of the fine polymer particles (B) to a mass (W2) of the blocked urethane (C) being 0.1 to 10.0; a contained amount of the cyano group with respect to the total mass of the shell layer of the fine polymer particles (B) being 5.0 mmol/g to 10.0 mmol/g.

A curable resin composition in accordance with one or more embodiments of the present invention brings about the effects of (i) having a viscosity whose temperature dependence is low and (ii) providing excellent workability in an adhesion method which uses the curable resin composition.

DETAILED DESCRIPTION OF THE EMBODIMENTS

The following description will discuss one or more embodiments of the present invention. The present disclosure is not, however, limited to these embodiments. One or more embodiments of the present invention are not limited to the configurations described below, but may be altered in various ways within the scope of the claims. One or more embodiments of the present invention also encompass, in their technical scope, any embodiments or examples derived by combining technical means disclosed in differing embodiments and examples. Further, it is possible to form a new technical feature by combining the technical means disclosed in various embodiments. All academic and patent documents cited in the present specification are incorporated herein by reference. Any numerical range expressed as "A to B" in the present specification means "not less than A and not more than B (i.e., a range from A to B which includes both A and B)" unless otherwise stated.

1. Technical Ideas of One or More Embodiments of the Present Invention

The temperature dependence of the viscosity of a curable resin composition as described above can become problematic, depending on the method of using the curable resin composition. As such, improvement is desirable.

The inventor of one or more embodiments of the present invention studied the heat-and-apply type epoxy-based adhesive agent disclosed in Patent Literature 5. This heat-and-apply type epoxy-based adhesive agent corresponds to a curable resin composition in one or more embodiments of the present invention. As a result of the study, the inventor novelly found that, if a heat-and-apply type epoxy-based adhesive agent has viscosity that is highly temperature dependent, it is difficult to achieve both (i) workability when the adhesive agent is heated and applied (hereinafter, also "during heating and application") and (ii) workability, in a room temperature environment, of the adhesive agent once applied. Specifically, the inventor novelly found that if a heat-and-apply type epoxy-based adhesive agent has viscosity that is highly temperature dependent, the following arise: (i) If the viscosity of the adhesive agent is set to be low during heating and application, the viscosity will be too low during heating and application and the adhesive agent may run after application; and (ii) if the viscosity of the adhesive agent is set to be high during heating and application, then in a room temperature environment after heating and application of the adhesive agent, the temperature of the composition (adhesive agent) that has been applied will drop to room temperature, the viscosity of the adhesive agent will become markedly high, and it may be difficult to thinly spread the applied adhesive agent.

Patent Literature 2 is directed to the thixotropy of a composition. Patent Literature 3 is directed to the storage stability of a composition. Patent Literature 4 is directed to the shock resistance of a cured product obtained by curing a composition. Each of the Patent Literatures is completely silent regarding a means of improving the temperature dependence of viscosity.

Thus, the inventor of one or more embodiments of the present invention focused on improving the temperature dependence of the viscosity of a curable resin composition. It is known that a resin composition in which a particle component such as the fine polymer particles (B) in accordance with one or more embodiments of the present invention is dispersed in a matrix resin in liquid form such as the epoxy resin (A) is likely to exhibit structural viscosity occurring along with weak interaction between the particles of the particle component (hereinafter, also "between particles"). The inventor focused on obtaining a resin composition having high structural viscosity at both low and high temperatures in order to improve the temperature dependence of the viscosity of the resin composition. The inventor carried out diligent research to this end. Through this research, the inventor novelly found that a greater difference between the polarity of the matrix resin and the polarity of the particle component correlates to a greater structural viscosity of the resin composition even at high temperatures. Specifically, the inventor novelly found that decreasing the polarity of the matrix resin and increasing the polarity of particle component increases the structural viscosity of the resin composition even at high temperatures.

Based on this novel knowledge, the inventor carried out further diligent research and novelly found that, in a curable resin composition containing epoxy resin, the temperature dependence of the viscosity of the curable resin composition is changed by (i) the combined use of fine polymer particles having a core-shell structure and blocked urethane, (ii) the quantity ratio of the fine polymer particles having the core-shell structure to the blocked urethane, (iii) the structure of the blocked urethane, and (iv) the structure of the fine core-shell polymer particles. Based on this new knowledge, the inventor carried out diligent research on fine polymer particles and blocked urethane, and accomplished one or more embodiments of the present invention as a result thereof.

2. Adhesion Method (First Adhesion Method)

An adhesion method in accordance with one or more embodiments of the present invention includes: (i) a step 1 of heating a curable resin composition to a first temperature and applying the curable resin composition to a first adherend so as to have a first thickness; (ii) a step 2 of spreading, to a second thickness, the curable resin composition that has been applied, the spreading being performed in an environment at a second temperature, the spreading being performed prior to or simultaneously with affixing a second adherend to the first adherend; and (iii) a step 3 of curing the curable resin composition sandwiched between the two adherends that have been affixed to each other. The first temperature is higher than the second temperature, and the second thickness is less than the first thickness. The curable resin composition contains: an epoxy resin (A); fine polymer particles (B) that have a core-shell structure including a core layer and a shell layer, the shell layer having a cyano group; and blocked urethane (C), the fine polymer particles (B)

being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A). A ratio (W1/W2) of a mass (W1) of the fine polymer particles (B) to a mass (W2) of the blocked urethane (C) is 0.1 to 10.0. The contained amount of the cyano group with respect to the total mass of the shell layer of the fine polymer particles (B) is 5.0 mmol/g to 10.0 mmol/g. Herein, this adhesion method is also referred to as a first adhesion method.

By having the above configuration, the first adhesion method in accordance with one or more embodiments of the present invention provides excellent workability. A laminate obtained by the first adhesion method in accordance with one or more embodiments of the present invention has an adhesive layer (cured product) that has excellent toughness and excellent impact-peel-resistant adhesiveness 2-1. Curable Resin Composition The following description will discuss in detail a curable resin composition used in the first adhesion method in accordance with one or more embodiments of the present invention.

The curable resin composition in accordance with one or more embodiments of the present invention contains: an epoxy resin (A); fine polymer particles (B) that have a core-shell structure including a core layer and a shell layer, the shell layer having a cyano group; and blocked urethane (C), the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A), a ratio (W1/W2) of a mass (W1) of the fine polymer particles (B) to the mass (W2) of the blocked urethane (C) being 0.1 to 10.0, a contained amount of the cyano group with respect to the total amount of the shell layer of the fine polymer particles (B) being 5.0 mmol/g to 10.0 mmol/g.

The curable resin composition in accordance with one or more embodiments of the present invention has a viscosity that has low temperature dependence, and is effective when used in the first adhesion method in accordance with one or more embodiments of the present invention.

The curable resin composition in accordance with one or more embodiments of the present invention makes it possible to provide a cured product that has excellent toughness and excellent impact-peel-resistant adhesiveness.

The curable resin composition can be used to adhere at least two adherends to each other and can therefore also be called an adhesive agent. Herein, the curable resin composition may also be referred to as a "curable epoxy resin composition", a "composition", or as "adhesive agent".

It is not clear why the viscosity of the curable resin composition has low temperature dependence in the first adhesion method in accordance with one or more embodiments of the present invention, but the reasons are surmised as follows. It is known that a system in which a particle component such as the fine polymer particles (B) in accordance with one or more embodiments of the present invention is dispersed in a matrix resin in liquid form such as the epoxy resin (A) is likely to exhibit structural viscosity that occurs along with weak interaction between the particles of the particle component (hereinafter, also "between particles"). The interaction between particles is presumably dependent on the polarity of the fine polymer particles (B) having the core-shell structure and the polarity of the matrix resin. In one or more embodiments of the present invention, (i) the polarity of the fine polymer particles (B) is controlled by introducing a cyano group into the shell layers of the fine polymer particles (B), and (ii) the polarity of the matrix resin is controlled by blending in the blocked urethane (C), which has a relatively low polarity compared to the high polarity of the epoxy resin (A). In other words, in one or more embodiments of the present invention, the polarity of the particle component is increased by introducing the cyano group into the shell layers of the fine polymer particles (B), and the polarity of the matrix resin is decreased by blending in the blocked urethane (C), which has a relatively low polarity compared to the epoxy resin (A). When this is done, an increase in interaction between particles can be expected in one or more embodiments of the present invention. It is surmised that increasing the interaction between particles makes it difficult for particles to be separated from each other even at high temperatures, and as a result, the structural viscosity is maintained even at high temperatures such that the viscosity has lower temperature dependence. However, one or more embodiments of the present invention are not limited to the above presumptions and expectations.

2-1-1. Epoxy Resin (A)

An epoxy resin (A) is used as a main component of the curable resin composition in accordance with one or more embodiments of the present invention.

Herein, the epoxy resin (A) may also be referred to as a "component (A)".

It is possible to use, as the epoxy resin (A), various types of hard epoxy resin, except for the rubber-modified epoxy resin and urethane-modified epoxy resin described later. Examples of the epoxy resin (A) encompass bisphenol A epoxy resin, bisphenol F epoxy resin, bisphenol AD epoxy resin, bisphenol S epoxy resin, glycidyl ester type epoxy resin, glycidyl amine type epoxy resin, novolac type epoxy resin, a glycidyl ether epoxy resin of bisphenol A propylene oxide adduct, hydrogenated bisphenol A (or F) epoxy resin, fluorinated epoxy resin, flame-resistant epoxy resin such as glycidyl ether of tetrabromo bisphenol A, p-oxybenzoic acid glycidyl ether ester type epoxy resin, m-aminophenol type epoxy resin, diaminodiphenylmethane-based epoxy resin, various types of alicyclic epoxy resin, N,N-diglycidyl aniline, N,N-diglycidyl-o-toluidine, triglycidyl isocyanurate, divinylbenzene dioxide, resorcinol diglycidyl ether, polyalkylene glycol diglycidyl ether, glycol diglycidyl ether, diglycidyl ester of aliphatic polybasic acid, glycidyl ether of a polyvalent aliphatic alcohol having bivalency or greater valency such as glycerin, chelate-modified epoxy resin, hydantoin-type epoxy resin, an epoxidized unsaturated polymer such as petroleum resin, amino-containing glycidyl ether resin, and an epoxy compound obtained by causing an addition reaction between one of the above epoxy resins and e.g. a bisphenol A (or F) or a polybasic acid. The epoxy resin (A) is not limited to these examples. A typically used epoxy resin can be used as the epoxy resin (A).

The term "hard epoxy resin" refers to epoxy resin having a specific glass transition temperature (Tg), for example, an epoxy resin having a Tg of not less than 50° C.

More specific examples of the polyalkylene glycol diglycidyl ether encompass polyethylene glycol diglycidyl ether and polypropylene glycol diglycidyl ether. More specific examples of the glycol diglycidyl ether encompass neopentyl glycol diglycidyl ether, 1,4-butanediol diglycidyl ether, 1,6-hexanediol diglycidyl ether, and cyclohexane dimethanol diglycidyl ether. More specific examples of the diglycidyl ester of aliphatic polybasic acid encompass dimer acid diglycidyl ester, adipic acid diglycidyl ester, sebacic acid diglycidyl ester, and maleic acid diglycidyl ester. More specific examples of the glycidyl ether of a polyvalent aliphatic alcohol having bivalency or greater valency encompass trimethylolpropane triglycidyl ether, trimethylolethane triglycidyl ether, castor oil-modified polyglycidyl ether, propoxylated glycerine triglycidyl ether, and sorbitol polyglycidyl ether. Examples of the epoxy compound obtained by causing an addition reaction between epoxy resin and e.g. a polybasic acid encompass an addition reaction product of (i) a dimer (dimer acid) of a tall oil fatty acid and (ii) bisphenol A epoxy resin, such as that disclosed in WO 2010-098950. These epoxy resins may be used alone or in combinations of two or more.

The polyalkylene glycol diglycidyl ether, the glycol diglycidyl ether, the diglycidyl ester of aliphatic polybasic acid, and the glycidyl ether of a polyvalent aliphatic alcohol having bivalency or greater valency are epoxy resins having a comparatively low viscosity. When these epoxy resins are used in combination with another epoxy resin such as bisphenol A epoxy resin or bisphenol F epoxy resin, these epoxy resins can function as a reactive diluent. As a result, these epoxy resins can improve the balance between the viscosity of a composition and the properties of a cured product obtained from the composition. The curable resin composition in accordance with one or more embodiments of the present invention may contain an epoxy resin that can function as a reactive diluent. The contained amount of these epoxy resins functioning as a reactive diluent, in 100 mass % of the epoxy resin (A), is 0.5 mass % to 20 mass %, 1 mass % to 10 mass %, or 2 mass % to 5 mass %.

The chelate-modified epoxy resin is a reaction product of an epoxy resin and a compound (chelating ligand) containing a chelating functional group. If a chelate-modified epoxy resin is added to the curable resin composition in accordance with one or more embodiments of the present invention and the curable resin composition is used as an adhesive agent, it is possible to improve adhesiveness to the surface of a metal base material that has been contaminated with an oily substance. A chelating functional group is a functional group of a compound having in its molecule a plurality of coordinations capable of chelating with metal ions. Examples of a chelating functional group encompass a phosphorus acid group (e.g. $-PO(OH)_2$), a carboxylic acid group ($-CO_2H$), a sulfur-containing acid group (e.g., $-SO_3H$), an amino group, and a hydroxy group (particularly hydroxy groups adjacent to each other in an aromatic ring). Examples of the chelating ligand encompass ethylenediamine, bipyridine, ethylenediaminetetraacetic acid, phenanthroline, porphyrin, and crown ether. Examples of commercially available chelate-modified epoxy resin include Adeka Resin EP-49-10N manufactured by ADEKA.

The used amount of the chelate-modified epoxy resin in the component (A) may be 0.1 mass % to 10 mass %, or 0.5 mass % to 3 mass %.

Herein, the "used amount" of a component can also be called the "added amount" of that component, and can also be called the "contained amount" of that component in the curable resin composition.

Out of these epoxy resins, resins which have at least two epoxy groups in one molecule are preferable in that, e.g., such resins increase the reactivity during curing of the resultant curable resin composition and make it easy for the resultant cured product to create a three-dimensional mesh.

Out of the abovementioned epoxy resins, bisphenol A epoxy resin and bisphenol F epoxy resin are preferable because they are relatively inexpensive and make it possible to obtain a cured product which has a high elastic modulus, excellent heat resistance, and excellent adhesiveness. Bisphenol A epoxy resin is particularly preferable.

Out of the abovementioned various epoxy resins, epoxy resins whose epoxy equivalent weight is less than 220 are preferable because such epoxy resins (i) allow a resulting cured product to have a high elastic modulus and a high heat resistance, and (ii) have a viscosity with low temperature dependence. Out of the abovementioned epoxy resins, epoxy resins whose epoxy equivalent weight is not less than 90 and less than 210 are more preferable, and epoxy resins whose epoxy equivalent weight is not less than 150 and less than 200 are even more preferable.

The epoxy resin (A) may be bisphenol A epoxy resin having an epoxy equivalent weight of less than 220 and/or bisphenol F epoxy resin having an epoxy equivalent weight of less than 220.

In particular, bisphenol A epoxy resin having an epoxy equivalent weight of less than 220 and bisphenol F epoxy resin having an epoxy equivalent weight of less than 220 are preferable because they are liquid at normal temperature, and allow a resultant curable resin composition to have (i) a viscosity that has low temperature dependency and (ii) good handleability.

Bisphenol A epoxy resin and bisphenol F epoxy resin having an epoxy equivalent weight of not less than 220 but less than 5000 may be added in a total amount so as to constitute not more than 40 mass % or not more than 20 mass %, of 100 mass % of the component (A). Such a configuration is advantageous in that it allows the resulting cured product to have excellent shock resistance.

2-1-2. Fine Polymer Particles (B)

The curable resin composition in accordance with one or more embodiments of the present invention includes fine polymer particles (B) having a core-shell structure that includes a core layer and a shell layer having a cyano group. The contained amount of a cyano group with respect to the total mass of the shell layer is 5.0 mmol/g to 10.0 mmol/g. The fine polymer particles (B) are used in an amount of 1 part by mass to 100 parts by mass with respect to 100 parts by mass of the component (A).

Herein, the fine polymer particles (B) are also referred to as "fine polymer particles", "polymer particles", a "core-shell polymer (B)", and a "component (B)".

The toughness-improving effect of component (B) allows a resulting cured product to have excellent toughness and an excellent elongation property.

Setting the contained amount of the cyano group in the shell layers of the component (B) to be 5.0 mmol/g to 10.0 mmol/g with respect to the total mass of the shell layer makes it possible to obtain a curable resin composition whose viscosity has low temperature dependence. If the contained amount of the cyano group in the shell layers of the component (B) with respect to the total mass of the shell layer is less than 5.0 mmol/g, the viscosity of the resulting curable resin composition tends to have higher temperature dependence. If said contained amount is greater than 10.0 mmol/g, after production of the fine polymer particles there tends to be an increase in the amount of a cyano group-containing monomer remaining in the fine polymer particles obtained.

In terms of (i) the temperature dependence of the viscosity of the resulting curable resin composition and (ii) the impact strength of the cured product obtained by curing the curable resin composition, the contained amount of the cyano group in the shell layers of the component (B) with respect to the total amount of the shell layer may be necessarily 5.0 mmol/g to 10.0 mmol/g, 5.5 mmol/g to 9.5 mmol/g, or 7.0 mmol/g to 9.0 mmol/g.

The amount of the component (B) with respect to 100 parts by mass of the component (A) may be 1 part by mass to 100 parts by mass, 3 parts by mass to 70 parts by mass, 5 parts by mass to 50 parts by mass, or 10 parts by mass to 40 parts by mass. This is because such amounts enable a favorable balance between the handleability of the resulting curable resin composition and the effect of improving the toughness of the resulting cured product.

Combining the fine polymer particles having the cyano group in their shell layer (i.e., the fine polymer particles which are the component (B) in accordance with one or more embodiments of the present invention) with the blocked urethane (i.e., a component (C) as described later) makes it possible to obtain a curable resin composition whose viscosity has low temperature dependence.

The volume-average particle size (Mv) of the fine polymer particles is not particularly limited, but in consideration of the industrial productivity may be 10 nm to 2000 nm, 30 nm to 600 nm, 50 nm to 400 nm, or 100 nm to 200 nm. The volume-average particle size (Mv) of the polymer particles can be measured with use of a dynamic light scattering type particle size distribution measurement apparatus (such as the Microtrac UPA150 manufactured by Nikkiso Co., Ltd.), using an aqueous latex containing the fine polymer particles (B) as a test specimen.

The method of measuring the volume-average particle size of the fine polymer particles (B) is described in detail in the Examples below. The volume-average particle size of the fine polymer particles (B) can also be measured by cutting a cured product of the curable resin composition, using e.g. an electron microscope to obtain an image of the cut section, and then using the obtained image data (image) to measure the volume-average particle size.

In a particle-number-based distribution of the volume-average particle size of the component (B) in the composition in accordance with one or more embodiments of the present invention, the component (B) may have a full width at half maximum which is not less than 0.5 times and not more than 1 times the volume-average particle size. This results in a curable resin composition that has low viscosity and is easy to handle.

In terms of easily achieving the above specific particle size distribution, the particle-number-based distribution of the volume-average particle size of the component (B) may have two or more maximum values. In terms of labor and cost during production, the particle-number-based distribution may have two to three maximum values, or may have two maximum values. In particular, the component (B) may include fine polymer particles whose volume-average particle size is not less than 10 nm but less than 150 nm in an amount of 10 mass % to 90 mass %, or may include fine polymer particles whose volume-average particle size is not less than 150 nm and not more than 2000 nm in an amount of 90 mass % to 10 mass %.

The component (B) may be dispersed in the form of primary particles in the curable resin composition. In one or more embodiments of the present disclosure, "fine polymer particles are dispersed in the form of primary particles in the curable resin composition" (hereinafter also referred to as "primary dispersion") means that fine polymer particles are dispersed so as to be substantially independent from each other (not in contact). This state of dispersion can be confirmed by, for example, dissolving part of the curable resin composition in a solvent such as methyl ethyl ketone, and measuring the volume-average particle size (Mv)/number-average particle size (Mn) of the fine polymer particles (B) in the resulting solution with use of e.g. a dynamic light scattering type particle size distribution measurement apparatus.

The value of the volume-average particle size (Mv)/number-average particle size (Mn) obtained via the above-described particle size measurement is not particularly limited but may be not more than 3, not more than 2.5, not more than 2, or not more than 1.5. Presumably, when the value of volume-average particle size (Mv)/number-average particle size (Mn) is not more than 3, dispersion is favorable. Conversely, a curable resin composition having a particle size distribution such that this value is greater than 3 can result in a cured product that has a deterioration in properties such as shock resistance and adhesiveness.

The value of the volume-average particle size (Mv)/number-average particle size (Mn) can be determined by measuring both the volume-average particle size (Mv) and the number-average particle size (Mn) with use of the Microtrac UPA (manufactured by Nikkiso Co., Ltd.) and then dividing My by Mn.

"Stable dispersion" of the fine polymer particles refers to a state in which the fine polymer particles are, under normal conditions, in a steady state of dispersion over a long period without agglutinating, separating, or precipitating in a continuous layer. It is also preferable that (i) the distribution of the fine polymer particles in a continuous layer remains substantially unchanged, and (ii) stable dispersion of the fine polymer particles (B) is maintained even if the continuous layer (for example, the curable resin composition) is heated to a non-dangerous degree so as to lower the viscosity of the continuous layer and the continuous layer is stirred.

One type of component (B) may be used alone, or two or more types may be used in combination.

The fine polymer particles are not particularly limited in terms of the structure thereof, but may have a core-shell structure having two or more layers. The fine polymer particles (B) may have a structure having three or more layers, the structure including a core layer, an intermediate layer covering the core layer, and a shell layer covering the intermediate layer.

It can be said that the fine polymer particles (B) may have a core-shell structure having one or more core layers and one or more shell layers.

The following description will discuss each layer more specifically.

Core Layer

Examples of the core layer of a core-shell polymer (B) in accordance with one or more embodiments of the present invention encompass (i) natural rubber, (ii) a rubber elastic body obtained by polymerizing a monomer mixture containing (a) 50 mass % to 100 mass % of at least one type of monomer (also referred to as a "first monomer") selected from the group consisting of diene-based monomers (also referred to as "conjugated diene-based monomers") and (meth)acrylate-based monomers, and (b) 0 mass % to 50 mass % of another monomer which is a vinyl-based monomer (also referred to as a "second monomer") that is copolymerizable with the first monomer, (iii) a polysiloxane rubber-based elastic body, and (iv) a combination of any of these.

The polysiloxane rubber-based elastic body is also referred to as "organosiloxane-based rubber".

A rubber elastic body obtained by polymerizing a monomer mixture containing (a) 50 mass % to 100 mass % of at least one type of monomer selected from the group consisting of diene-based monomers and (b) 0 mass % to 50 mass % of another monomer which is a vinyl-based monomer that is copolymerizable with a diene-based monomer is also referred to as a "diene-based rubber".

A rubber elastic body obtained by polymerizing a monomer mixture containing (a) 50 weight % to 100 weight % of at least one type of monomer selected from the group consisting of (meth)acrylate-based monomers and (b) 0 weight % to 50 weight % of another monomer which is vinyl-based monomer that is copolymerizable with a (meth) acrylate-based monomer is also referred to as a "(meth) acrylate-based rubber".

The core layer may contain at least one selected from the group consisting of diene-based rubber, (meth)acrylate-based rubber, and organosiloxane-based rubber.

The core layer may be a diene-based rubber which uses a diene-based monomer, in that such a material (i) has a large effect of improving the toughness of the resulting cured product and (ii) has a low affinity with the matrix resin, which makes it difficult for viscosity to increase with time due to swelling of the core layer. The core layer may be a (meth)acrylate-based rubber which uses a (meth)acrylate-based monomer, in that such a material enables wide-ranging polymer design by combination of a plurality of monomers. In a case where it is desirable to increase shock resistance at low temperatures without decreasing the heat resistance of the cured product, an elastic core layer may be a polysiloxane rubber-based elastic body. Note that, herein, "(meth)acrylate" means acrylate and/or methacrylate. Furthermore, the term "elastic core layer" refers to a core layer having properties as a rubber.

Core Layer (Diene-Based Rubber)

Examples of the diene-based monomer (conjugated diene-based monomer) for the first monomer encompass 1,3-butadiene, isoprene(2-methyl-1,3-butadiene), and 2-chloro-1,3-butadiene. These diene-based monomers may be used alone or in combination of two or more.

The core layer may be butadiene rubber and/or butadiene-styrene rubber.

The core layer may be (i) butadiene rubber which uses 1,3-butadiene or (ii) butadiene-styrene rubber which is a copolymer of 1,3-butadiene and styrene, in that such materials (a) have a large effect of improving the toughness and (b) have a low affinity with the matrix resin, which makes it difficult for viscosity to increase with time due to swelling of the core layer.

In terms of these effects, butadiene rubber is more preferable. Butadiene-styrene rubber is more preferable in that butadiene-styrene rubber makes it possible to increase the transparency of the resulting cured product by adjusting refractive index.

Core Layer (Acrylic Rubber)

Examples of the (meth)acrylate-based monomer for the first monomer encompass (i) alkyl (meth)acrylates such as methyl (meth)acrylate, ethyl (meth)acrylate, butyl (meth) acrylate, 2-ethylhexyl (meth)acrylate, octyl (meth)acrylate, dodecyl (meth)acrylate, stearyl (meth)acrylate, and behenyl (meth)acrylate, (ii) aromatic ring-containing (meth)acrylates such as phenoxyethyl (meth)acrylate and benzyl (meth) acrylate, (iii) hydroxyalkyl (meth)acrylates such as 2-hydroxyethyl (meth)acrylate and 4-hydroxybutyl (meth)acrylate, (iv) glycidyl (meth)acrylates such as glycidyl (meth) acrylate and glycidyl alkyl (meth)acrylate, (v) alkoxy alkyl (meth)acrylates, (vi) allyl alkyl (meth)acrylates such as allyl (meth)acrylate and allyl alkyl (meth)acrylate, and (vii) polyfunctional (meth)acrylates such as monoethylene glycol di(meth)acrylate, triethylene glycol di(meth)acrylate, and tetraethylene glycol di(meth)acrylate. These (meth)acrylate-based monomers may be used alone or in combination of two or more. Ethyl (meth)acrylate, butyl (meth)acrylate, and 2-ethylhexyl (meth)acrylate are particularly preferable as the (meth)acrylate-based monomer.

Second Monomer

Examples of the other monomer which is the vinyl-based monomer (second monomer) that is copolymerizable with the first monomer encompass (i) vinyl arenes such as styrene, α-methylstyrene, monochlorostyrene, and dichlorostyrene, (ii) vinyl carboxylic acids such as acrylic acid and methacrylic acid, (iii) vinyl cyanides such as acrylonitrile and methacrylonitrile, (iv) vinyl halides such as vinyl chloride, vinyl bromide, and chloroprene, (v) vinyl acetate, (vi) alkenes such as ethylene, propylene, butylene, and isobutylene, and (vii) polyfunctional monomers such as diallylphthalate, triallyl cyanurate, triallyl isocyanurate, and divinylbenzene. These vinyl-based monomers may be used alone or in combination of two or more. Styrene is particularly preferable in that styrene makes it possible to easily increase refractive index.

Polysiloxane Rubber-Based Elastic Body

Example of the polysiloxane rubber-based elastic body encompass (i) polysiloxane-based polymers composed of akyl or aryl disubstituted silyloxy units, such as dimethylsilyloxy, diethylsilyloxy, methylphenylsilyloxy, diphenylsilyloxy, and dimethylsilyloxy-diphenylsilyloxy, and (ii) polysiloxane-based polymers composed of alkyl or aryl monosubstituted silyloxy units, such as organohydrogensilyloxy in which some of sidechain alkyls have been substituted with a hydrogen atom. These polysiloxane-based polymers may be used alone or in combination of two or more. Out of these examples, dimethylsilyloxy, methylphenylsilyloxy, and dimethylsilyloxy-diphenylsilyloxy are preferable because they can provide heat resistance to the cured product. Dimethylsilyloxy is most preferable because it can be easily acquired and is economical. In an aspect in which the core layer is formed from a polysiloxane rubber-based elastic body, a polysiloxane-based polymer part may be contained in an amount of not less than 80 mass % (or not less than 90 mass %), where 100 mass % represents the entirety of the elastic body. This is in order to avoid a deterioration in the heat resistance of the cured product.

Crosslinking of Core Layer

The core layer of the core-shell polymer (B) may have a crosslinked structure introduced therein, in order to maintain stable dispersion of the core-shell polymer (B) in the curable epoxy resin composition. A generally known method may be used to introduce the crosslinked structure.

Examples of methods for introducing a crosslinked structure into a polymer component obtained by polymerizing the first monomer and the second monomer encompass a method in which a crosslinking monomer(s), such as a polyfunctional monomer and/or a mercapto group-containing compound, is/are added to the polymer component, and then polymerization is carried out. Methods of introducing a crosslinked structure into a polysiloxane-based polymer encompass (i) a method that involves also partially using a polyfunctional alkoxysilane compound during polymerization, (ii) a method that involves introducing into the polysiloxane-based polymer a reactive group, such as a reactive vinyl group or a mercapto group, and thereafter adding e.g. organic peroxide or a polymerizable vinyl monomer and carrying out a radical reaction, and (iii) a method that involves adding to the polysiloxane-based polymer a crosslinking monomer(s), such as a polyfunctional monomer and/or a mercapto group-containing compound, and then carrying out polymerization.

Polyfunctional Monomer

Examples of the polyfunctional monomer encompass (i) allylalkyl (meth)acrylates such as allyl (meth)acrylate and allyl alkyl (meth)acrylate, (ii) allyl oxyalkyl (meth)acrylates, (iii) polyfunctional (meth)acrylates that have two or more (meth)acrylic groups such as (poly)ethylene glycol di(meth)acrylate, butanediol di(meth)acrylate, ethylene glycol di(meth)acrylate, triethylene glycol di(meth)acrylate, and tetraethylene glycol di(meth)acrylate, and (iv) diallylphthalate, triallyl cyanurate, triallyl isocyanurate, and divinylbenzene. Allyl methacrylate, triallyl isocyanurate, butanediol di(meth)acrylate, and divinylbenzene are particularly preferable.

Gel Content of Core Layer

The core layer of the core-shell polymer (B) in accordance with one or more embodiments of the present invention may have properties as a rubber in order to increase the toughness of the cured product of the curable epoxy resin composition. In terms of the toughness of the cured product, the core layer of the core-shell polymer (B) in accordance with one or more embodiments of the present invention may have a gel content of not less than 60 mass %, not less than 80 mass %, not less than 90 mass %, or not less than 95 mass %.

Note that herein, "gel content" refers to a percentage found by (i) immersing, in 100 g of toluene, 0.5 g of crumbs (powder including the fine polymer particles (B)) obtained by agglutination and drying of the core-shell polymer (B), (ii) allowing the crumbs to stand immersed for 24 hours at 23° C., (iii) separating the part that was soluble in the toluene from the part that was insoluble in the toluene, and (iv) determining the ratio of the insoluble part to the combined amount of the insoluble and soluble parts.

Tg of Core Layer

In order to increase the toughness of the resulting cured product, the core layer of the core-shell polymer (B) in one or more embodiments of the present invention may have a glass transition temperature (hereinafter also referred to simply as "Tg") of not higher than 0° C., not higher than –20° C., not higher than –40° C., or not higher than –60° C.

However, in cases where it is desirable to prevent a decrease in rigidity (which can also be called a decrease in elastic modulus) of the resulting cured product, the Tg of the core layer may be higher than 0° C., not lower than 20° C., not lower than 50° C., not lower than 80° C., or not lower than 120° C.

Examples of a polymer which has a Tg higher than 0° C. and is able to form a core layer that can prevent or reduce a decrease in rigidity of the resulting cured product may encompass a polymer which is obtained by polymerizing a monomer mixture containing (i) 50 mass % to 100 mass % (or 65 mass % to 99 mass %) of at least one type of monomer whose Tg as a homopolymer is higher than 0° C. and (ii) 0 mass % to 50 mass % (or 1 mass % to 35 mass %) of at least one type of monomer whose Tg as a homopolymer is lower than 0° C.

Even if the Tg of the core layer is higher than 0° C., it is preferable to introduce a crosslinked structure in the core layer. Examples of methods for introducing the crosslinked structure encompass the methods described above.

Examples of a monomer whose Tg as a homopolymer is higher than 0° C. encompass the various compounds disclosed in paragraph [0084] of the specification of WO 2014-196607.

Volume-Average Particle Size of Core Layer

The core layer of the core-shell polymer (B) in accordance with one or more embodiments of the present invention may have a volume-average particle size of 0.03 µm to 2 µm, or 0.05 µm to 1 µm. If the volume-average particle size of the core layer of the core-shell polymer (B) is not less than 0.03 µm, in many cases it is easy to obtain the core layer stably. If the volume-average particle size of the core-shell polymer (B) of the core-shell polymer (B) is not more than 2 µm, there is no risk of deterioration of the heat resistance and shock resistance of the final formed product (cured product).

Core Layer Ratio

The core layer of the core-shell polymer (B) in accordance with one or more embodiments of the present invention may constitute 40 mass % to 97 mass % of the core-shell polymer (B), 60 mass % to 95 mass %, 70 mass % to 93 mass %, or 80 mass % to 90 mass %, where 100 mass % represents the entirety of the core-shell polymer (B). If the core layer constitutes not less than 40 mass % out of 100 mass % of the core-shell polymer (B), there will be a sufficient effect of improving the toughness of the cured product. If the core layer constitutes not more than 97 mass % out of 100 mass % of core-shell polymer (B), there are the advantages that the fine polymer particle will be unlikely to agglutinate, and the curable epoxy resin composition will have low viscosity and be easy to handle.

Multilayer Structure of Core Layer

In one or more embodiments of the present invention, the core layer may have a multilayer structure. In cases where the core layer has a multilayer structure, each layer may have a differing polymer composition.

Intermediate Layer

The core-shell polymer (B) in accordance with one or more embodiments of the present invention may have an intermediate layer between the core layer and the shell layer. In particular, the core-shell polymer (B) may have as the intermediate layer a rubber surface-crosslinked layer as described below. In terms of an effect of improving the toughness of a resulting cured product and an effect of improving the impact-peel-resistant adhesiveness of the resulting cured product, it is preferable that the core-shell polymer (B) does not have as the intermediate layer the rubber surface-crosslinked layer described below.

The rubber surface-crosslinked layer is made of an intermediate layer polymer obtained by polymerizing a rubber surface-crosslinked layer component composed of (i) 30 mass % to 100 mass % of a polyfunctional monomer having two or more radical double bonds in the same molecule and (ii) 0 mass % to 70 mass % of another monomer which is a vinyl monomer. The rubber surface-crosslinked layer brings about (i) an effect of lowering the viscosity of the curable epoxy resin composition in accordance with one or more embodiments of the present invention and (ii) an effect of improving the dispersibility of the core-shell polymer (B) into the component (A). The rubber surface-crosslinked layer also brings about an effect of increasing the crosslinking density of the core layer and an effect of increasing the graft efficiency of the shell layer.

Specific examples of the polyfunctional monomer encompass the polyfunctional monomers mentioned above. Allyl methacrylate and triallyl isocyanurate are preferable examples.

Shell Layer

The shell layer which is the outermost part of the fine polymer particle is constituted by a shell polymer obtained by polymerizing a monomer for forming the shell layer. The shell polymer, i.e., the shell layer serves to (i) improve compatibility between the fine polymer particle (B) component and the component (A), and (ii) enable the fine polymer particles (B) to be dispersed in the form of primary particles in the curable resin composition in accordance with one or more embodiments of the present invention or in the cured product of the curable resin composition.

Such a shell polymer may be grafted to the core layer. More accurately, the core polymer that forms the core layer and the shell polymer that substantially forms the shell layer may be chemically bonded to each other by graft polymerizing, to the core polymer, the monomer component used to form the shell layer. The shell polymer may be formed by graft polymerizing the monomer for forming the shell layer to the core polymer in the presence of the core polymer. Forming the shell polymer in this way results in the shell polymer being graft polymerized to the core polymer and enables the shell polymer to cover part or all of the core polymer. This polymerization operation can be carried out by adding a monomer that is a component of the shell polymer to core polymer latex that is prepared and exists in the form of an aqueous polymer latex, and then carrying out polymerization.

In terms of compatibility and dispersibility of the component (B) in the curable resin composition, the monomer for forming the shell layer may be, e.g., an aromatic vinyl monomer, a vinyl cyanide monomer, and/or a (meth)acrylate monomer, or a (meth)acrylate monomer. These examples of monomers for forming the shell layer may be used alone or in combination as appropriate.

The shell layer may have a polymer obtained by graft polymerizing, to the core layer, one or more types of monomer components selected from the group consisting of aromatic vinyl monomers, vinyl cyanide monomers, and (meth)acrylate monomers. Such a configuration is advantageous in that it allows for excellent compatibility and excellent dispersibility of the component (B) in the curable resin composition.

The combined amount of the aromatic vinyl monomer, the vinyl cyanide monomer, and the (meth)acrylate monomer in 100 mass % of the monomer(s) for forming the shell layer may be 10 mass % to 95 mass %, 30 mass % to 92 mass %, 50 mass % to 90 mass %, 60 mass % to 87 mass %, or 70 mass % to 85 mass %.

In order to maintain a favorable state of dispersion of the component (B) in the cured product and/or polymer, without agglutination of the component (B), the shell layer may be chemically bonded to the component (A). In terms of chemically bonding the shell layer and the component (A), the monomer for forming the shell layer may contain a reactive-group-containing monomer which contains one or more from selected the group consisting of an epoxy group, a hydroxy group, and oxetane group, an amino group, an imide group, a carboxylic acid group, a carboxylic anhydride group, a cyclic ester, a cyclic amide, a benzoxazine group, and a cyanate ester group. The reactive-group-containing monomer may be a monomer having an epoxy group.

The shell layer may have an epoxy group. Such a configuration makes it possible to chemically bond the component (B) and the component (A), and, as a result, makes it possible to maintain a favorable state of dispersion of the component (B) in the cured product and/or polymer, without agglutination of the component (B). Such a configuration also has the advantage of making it possible to obtain a curable resin composition whose viscosity has lower temperature dependence.

The shell layer may have a polymer obtained by graft polymerizing, to the core layer, a monomer component having an epoxy group. Such a configuration has the advantages of (i) allowing the component (B) to have excellent compatibility and excellent dispersibility in the curable resin composition, and (ii) making it possible to chemically bond the component (B) and the component (A), so that it is possible to maintain a favorable state of dispersion of the component (B) in the cured product and/or polymer, without agglutination of the component (B).

The contained amount of epoxy group with respect to the total mass of the shell layer of the component (B) is not particularly limited. The contained amount of the epoxy group with respect to the total mass of the shell layer may be 0.1 mmol/g to 5.0 mmol/g, 0.2 mmol/g to 5.0 mmol/g, 0.3 mmol/g to 5.0 mmol/g, 0.4 mmol/g to 5.0 mmol/g, 0.4 mmol/g to 3.5 mmol/g, 0.4 mmol/g to 3.0 mmol/g, or 0.4 mmol/g to 2.5 mmol/g. This is because such contained amounts allow a resulting curable resin composition to have (i) a viscosity having lower temperature dependence and (ii) excellent storage stability. The contained amount of the epoxy group with respect to the total mass of the shell layer may be 0.2 mmol/g to 3.5 mmol/g, and may be 0.3 mmol/g to 3.0 mmol/g.

Specific examples of the monomer having the epoxy group encompass glycidyl-group-containing vinyl monomers such as glycidyl (meth)acrylate, 4-hydroxybutyl (meth)acrylate glycidyl ether, and allyl glycidyl ether.

It is preferable to use, as the monomer for forming the shell layer, a polyfunctional monomer having two or more radical polymerizing double bonds, in that doing so makes it possible to prevent swelling of fine polymer particles in the curable resin composition, and causes the curable resin composition to tend to have a low viscosity and favorable handleability. However, in terms of the effect of improving the toughness of the cured product and the effect of improving the impact-peel-resistant adhesiveness of the cured product, it is preferable not to use, as the monomer for forming the shell layer, a polyfunctional monomer having two or more radical polymerizing double bonds.

The amount of the polyfunctional monomer contained in 100 mass % of the monomer for forming the shell layer may be, for example, 0 mass % to 20 mass %, and may be 1 mass % to 20 mass %, or 5 mass % to 15 mass %.

Specific examples of the aromatic vinyl monomer encompass vinylbenzenes such as styrene, α-methylstyrene, p-methylstyrene, and divinylbenzene.

Specific examples of the vinyl cyanide monomer encompass acrylonitrile and methacrylonitrile.

Specific examples of the (meth)acrylate monomer encompass (i) alkyl (meth)acrylate esters such as methyl (meth)acrylate, ethyl (meth)acrylate, and butyl (meth)acrylate, and (ii) hydroxyalkyl (meth)acrylate esters such as hydroxyethyl (meth)acrylate and hydroxybutyl (meth)acrylate.

Specific examples of the monomer having a hydroxy group encompass (i) hydroxy straight-chain alkyl (meth)acrylate (in particular, a hydroxy straight chain C1-C6 alkyl(meth)acrylate) such as 2-hydroxyethyl (meth)acrylate, hydroxypropyl (meth)acrylate, and 4-hydroxybutyl (meth)acrylate, (ii) caprolactone-modified hydroxy (meth)acrylate, and (iii) hydroxyl-group-containing (meth)acrylates such as (a) hydroxy branching alkyl (meth)acrylate such as α-(hydroxymethyl) methyl acrylate and α-(hydroxymethyl) ethyl acrylate, and (b) a mono (meth)acrylate of a polyester diol (particularly saturated polyester diol) obtained from dicarboxylic acid (e.g. phthalic acid) and dihydric alcohol (e.g. propylene glycol).

Specific examples of the polyfunctional monomer having two or more radical polymerizing double bonds encompass the polyfunctional monomers mentioned above. Allyl methacrylate and triallyl isocyanurate are preferable examples.

In one or more embodiments of the present invention, the shell layer may be a polymer of monomers for forming the shell layer which may be, for example, a combination (total: 100 mass %) of: 0 mass % to 50 mass % (1 mass % to 50 mass %, or 2 mass % to 48 mass %) of an aromatic vinyl monomer (particularly styrene); 0 mass % to 50 mass % (0 mass % to 30 mass %, or 10 mass % to 25 mass %) of a vinyl cyanide monomer (particularly acrylonitrile); 0 mass % to 90 mass % (5 mass % to 85 mass %, or mass % to 80 mass %) of a (meth)acrylate monomer (particularly methyl methacrylate); and 5 mass % to 90 mass % (10 mass % to 50 mass %, or 15 mass % to 30 mass %) of an monomer having an epoxy group (particularly glycidyl methacrylate). This makes it possible to obtain a curable resin composition whose viscosity has lower temperature dependence.

These monomer components may be used alone or in combination of two or more.

The shell layer may include a monomer component other than the above monomer components.

The graft rate of the shell layer may be not less than 70% (not less than 80%, or not less than 90%). If the graft rate is less than 70%, the viscosity of the liquid resin composition may increase. Note that herein, the graft rate is calculated via the following method.

First, aqueous latex containing fine polymer particles is agglutinated, dehydrated, and then dried so as to obtain a fine polymer particle powder. Next, 2 g of the fine polymer particle powder is immersed in 100 g of methyl ethyl ketone (MEK) at 23° C. for 24 hours. Thereafter, a resulting mixture (the MEK with the powder immersed therein) is separated into a MEK-soluble part and MEK-insoluble part. A methanol-insoluble part is separated from the MEK-soluble part. The graft rate is then calculated as a ratio of the MEK-insoluble part to the total amount of the MEK-insoluble part and the methanol-insoluble part.

Method of Producing Fine Polymer Particles

Method of Producing Core Layer

In a case where the polymer forming the core layer of fine polymer particles used in one or more embodiments of the present invention includes at least one type of monomer (first monomer) selected from the group consisting of diene-based monomers (conjugated diene-based monomers) and (meth)acrylate-based monomers, the core layer may be formed by, for example, emulsion polymerization, suspension polymerization, and microsuspension polymerization. In such a case, the core layer can also be formed by using, for example, a method as disclosed in WO 2005/028546.

In a case where the polymer forming the core layer includes a polysiloxane-based polymer, the core layer can be formed by, for example, emulsion polymerization, suspension polymerization, or microsuspension polymerization. In such a case, the core layer can also be formed by using, for example, a method as disclosed in WO 2006/070664.

Method of Forming Shell Layer and Intermediate Layer

The intermediate layer can be formed by using a known radical polymerization method to polymerize a monomer for forming the intermediate layer. If the rubber elastic body to be contained in the core layer is obtained as an emulsion (also referred to as aqueous latex), formation of the intermediate layer (i.e., polymerization of a monomer having two or more radical polymerizing double bonds) may be carried out via an emulsion polymerization method.

The shell layer can be formed by using a known radical polymerization method to polymerize a monomer for forming the shell layer. If the core layer or a polymer particle precursor in which the core layer is covered with the intermediate layer is obtained as an emulsion (also referred to as aqueous latex), polymerization of the monomer for forming the shell layer may be carried out via an emulsion polymerization method. The shell layer may be produced, for example, via a method as disclosed in WO 2005/028546.

Examples of an emulsifying agent (dispersion agent) that can be used in the emulsion polymerization encompass, for example, the various emulsifying agents disclosed in paragraph [0073] of the specification of WO 2016-163491. These emulsifying agents (dispersion agents) may be used alone or in combination of two or more.

A smaller used amount of the emulsifying agent (dispersion agent) is more preferable, as long as there is no negative effect on the dispersion stability of the aqueous latex of the polymer particles. A higher water solubility of the emulsifying agent (dispersion agent) is more preferable. A high water solubility facilitates removal of the emulsifying agent (dispersion agent) by washing, and makes it possible to easily prevent adverse effects on the cured product that is ultimately obtained.

When an emulsion polymerization method is employed, it is possible to use, as a pyrolytic initiator, a known initiator such as 2,2'-azobisisobutyronitrile, hydrogen peroxide, potassium persulfate, or ammonium persulfate.

In the production of the fine polymer particles (B), it is also possible to use a redox initiator which contains a combination of (i) a peroxide such as (a) an organic peroxide such as t-butylperoxy isopropyl carbonate, paramenthane hydroperoxide, cumene hydroperoxide, dicumyl peroxide, t-butyl hydroperoxide, di-t-butyl peroxide, or t-hexyl peroxide, or (b) an inorganic peroxide such as hydrogen peroxide, potassium persulfate, or ammonium persulfate, and (ii) as necessary a reducing agent such as sodium formaldehyde sulfoxylate or glucose, as necessary a transition metal salt such as iron (II) sulfate, as necessary a chelating agent such as disodium ethylenediaminetetraacetate, and as necessary a phosphorus-containing compound such as sodium pyrophosphate.

Using a redox-initiator-based initiator is preferable because doing so makes it possible to (i) carry out polymerization even at a low temperature at which pyrolysis of the peroxide substantially does not occur, and (ii) select the polymerization temperature from a wide range of temperatures. Out of redox initiators, organic peroxides such as cumene hydroperoxide, dicumyl peroxide, and t-butyl hydroperoxide are more preferable for use as a redox initiator. The used amount of the initiator can be within a known range. If a redox initiator is used, the used amounts of e.g. the reducing agent, the transition metal salt, and the chelating agent can be within a known range. If a monomer having two or more radical polymerizing double bonds is polymerized, a known chain transfer agent can be used in an amount within a known range. A surfactant can be additionally used as necessary. The surfactant can be used in an amount within a known range.

Conditions of polymerization such as polymerization temperature, pressure, and deoxygenation can be set within well-known ranges. Polymerization of the monomer for forming the intermediate layer may be carried out in one stage or may be carried out in two or more stages. For polymerization of the monomer for forming the intermediate layer, it is possible to use, for example, (i) a method in which the monomer for forming the intermediate layer is added once to the emulsion (aqueous latex) of the rubber elastic body to be contained in the elastic core layer, (ii) a method in which the monomer for forming the intermediate layer is continuously added to the emulsion (aqueous latex), or (iii) a method in which polymerization is carried out after adding the emulsion of the rubber elastic body to be contained in the elastic core layer to a reaction vessel already containing the monomer for forming the intermediate layer.

2-1-3. Blocked Urethane (C)

A curable resin composition in accordance with one or more embodiments of the present invention necessarily contains 1 part by mass to 100 parts by mass of the blocked urethane (C), with respect to 100 parts by mass of the component (A).

Herein, the blocked urethane (C) may also be referred to as "blocked urethane" or "component (C)".

The toughness improving effect of the component (C) provides excellent toughness and an excellent elongation property to the resulting cured product.

Combining the component (C) with the fine polymer particles having a cyano group in the shell layer (component (B)) causes the resulting curable resin composition to have (i) a viscosity with lower temperature dependence and (ii) excellent workability.

A ratio (W1/W2) of the mass (W1) of the fine polymer particles (B) to the mass (W2) of the blocked urethane (C) may be 0.1 to 10.0, 0.2 to 7.0, 1.5 to 7.0, 1.8 to 5.0, 2.0 to 4.0, or 2.5 to 3.5. The ratio W1/W2 may also be 0.2 to 5.0, 0.3 to 4.0, 0.4 to 3.0, or 0.5 to 2.0. If the ratio W1/W2 is less than 0.1 or greater than 10, the viscosity of the resulting curable resin composition tends to have high temperature dependence. A ratio W1/W2 of not less than 1.5 has the advantage of avoiding a deterioration of the impact-peel-resistant adhesiveness, at low temperatures, of the cured product obtained by curing the curable resin composition.

The blocked urethane is an elastomer which is a compound that (i) contains a urethane group and/or a urea group and (ii) has an isocyanate group as a terminal group, a portion of or all of the isocyanate groups being capped with any of various blocking agents having an active hydrogen group. In particular, a compound in which all of the terminal isocyanate groups are capped with a blocking agent is preferable. Such a compound can be obtained by, for example, a method involving the following: (i) reacting an excessive amount of a polyisocyanate compound with an organic polymer having an active-hydrogen-containing group as a terminal group, so as to obtain a polymer (urethane prepolymer) that has a urethane group and/or a urea group in its main chain and has an isocyanate group as a terminal group; and (ii) after or simultaneously with the step "(i)" above, causing a blocking agent having an active hydrogen group to act on a portion or all of the isocyanate groups of the urethane prepolymer, so as to cap a portion or all of the isocyanate groups.

The blocked urethane is, for example, expressed by the following General Formula (1).

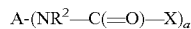
$$A\text{-}(NR^2\text{---}C(\text{=}O)\text{---}X)_a \qquad \text{General Formula (1)}$$

where: an "a" number of $R^2$ are each independently a C1 to C20 hydrocarbon group, "a" representing the average number of capped isocyanate groups per molecule, which may be not less than 1.1, 1.5 to 8, 1.7 to 6, or 2 to 4; "X" represents a part of the blocking agent excluding an active hydrogen atom; and "A" represents a part of an isocyanate-terminated prepolymer (for example, urethane prepolymer having an isocyanate group as a terminal group) excluding a terminal isocyanate group.

The isocyanate groups capped by the blocking agent are uncapped by heating. The uncapped isocyanate groups react with e.g. the active hydrogen-containing compound in the composition and improve the toughness of the resulting cured product. A "latent NCO %" is defined here as the mass % of the isocyanate groups uncapped by heating with respect to 100 weight % of the blocked urethane. The reaction between the urethane prepolymer and the blocking agent is presumably nearly quantitative. As such, when carrying out a reaction where the amount of the active hydrogen groups in the blocking agent is equivalent to or greater than the amount of isocyanate groups in the urethane prepolymer, the latent NCO % can be calculated by NCO titration of the urethane prepolymer prior to capping with the blocking agent. When carrying out a reaction where the amount of the active hydrogen groups in the blocking agent is less than the amount of isocyanate groups in the urethane prepolymer, the latent NCO % can be calculated from the amount of the blocking agent used in the reaction.

The latent NCO % can also be expressed with use of the unit "mmol/g". For the latent NCO, the unit "mmol/g" means the molar quantity (mmol) of the isocyanate groups uncapped by heating with respect to 1 g of blocked urethane. For the latent NCO, "%" and "mmol/g" are interchangeable.

In one or more embodiments of the present invention, the latent NCO % of the component (C) is not particularly limited, but in terms of temperature dependence of the viscosity of the resulting curable resin composition and the toughness of the cured product, may be 0.1 mmol/g to 10.0 mmol/g, 0.1 mmol/g to 5.0 mmol/g, 0.1 mmol/g to 4.0 mmol/g, or 0.1 mmol/g to 3.5 mmol/g.

In one or more embodiments of the present invention, the latent NCO % of the blocked urethane (C) may be 0.1% to 2.9%. Setting the latent NCO % of the component (C) to be 0.1% to 2.9% makes it possible to obtain a curable resin composition whose viscosity has low temperature dependence. Setting the latent NCO % of the component (C) to be not less than 0.1% avoids the risk of deterioration of the toughness of the cured product obtained by curing the curable resin composition. Setting the latent NCO % of the component (C) to be not more than 2.9% tends to cause the resulting curable resin composition to have a viscosity with lower temperature dependence.

In one or more embodiments of the present invention, in terms of temperature dependence of the viscosity of the resulting curable resin composition and the toughness of the cured product, the latent NCO % of the component (C) may be 0.3 mmol/g to 2.8 mmol/g, 0.5 mmol/g to 2.7 mmol/g, 1.0 mmol/g to 2.5 mmol/g, or 1.5 mmol/g to 2.3 mmol/g.

In one or more embodiments of the present invention, the latent NCO % of the component (C) may be 0.5 mmol/g to 5.0 mmol/g, 1.0 mmol/g to 4.0 mmol/g, or 1.5 mmol/g to 3.5 mmol/g.

The number average molecular weight of the blocked urethane, as determined as a polystyrene equivalent molecular weight measured by gel permeation chromatography (GPC), may be 2000 to 40000, 3000 to 30000, or 4000 to 20000. The molecular weight distribution of the blocked urethane (a ratio of weight average molecular weight to number average molecular weight) may be 1 to 4, 1.2 to 3, or 1.5 to 2.5.

The weight average molecular weight of the blocked urethane can be measured by GPC.

2-1-3-a. Organic Polymer Having Active-Hydrogen-Containing Group as Terminal Group Examples of a main chain skeleton of an organic polymer having an active-hydrogen-containing group as a terminal group encompass a polyether-based polymer, a polyacrylic-based polymer, a polyester-based polymer, a polydiene-based polymer, a saturated-hydrocarbon-based polymer (polyolefin), and a polythioether-based polymer.

Active Hydrogen Group

Examples of an active-hydrogen-containing group contained in the organic polymer having an active-hydrogen-containing group as a terminal group encompass a hydroxy group, an amino group, an imino group, and a thiol group. Out of these, in terms of availability, the hydroxy group, the amino group, and the imino group are preferable. In terms of the handleability (viscosity) of the resulting blocked urethane, the hydroxy group is more preferable.

Examples of the organic polymer having an active-hydrogen-containing group as a terminal group encompass a polyether-based polymer having a hydroxy group as a terminal group (polyether polyol), a polyether-based polymer having an amino group and/or an imino group as a terminal group (polyether amine), polyacrylic polyol, polyester polyol, a diene-based polymer having a hydroxy group as a terminal group (polydiene polyol), a saturated-hydrocarbon-based polymer having a hydroxy group as a terminal group (polyolefin polyol), an polythiol compound, and a polyamine compound. Out of these, polyether polyol, polyether amine, and polyacrylic polyol are preferable because they have excellent compatibility with the component (A), have a relatively low glass transition temperature as an organic polymer, and allow a resulting cured product to have excellent shock resistance at low temperatures. Polyether polyol and polyether amine are more preferable because a resulting organic polymer has low viscosity and favorable workability. Polyether polyol is particularly preferable.

One type of organic polymer may be used, or two or more types of organic polymers may be used as the organic polymer having an active-hydrogen-containing group as a terminal group, which organic polymer is used when preparing the urethane prepolymer that is a precursor of the blocked urethane.

The number average molecular weight of the organic polymer having an active-hydrogen-containing group as a terminal group, as determined as a polystyrene equivalent molecular weight measured by GPC, may be 800 to 7000, 1500 to 5000, or 2000 to 4000.

Polyether-Based Polymer

The polyether-based polymer is a polymer having a repeating unit expressed essentially by General Formula (2):

$$—R^1—O—$$  General Formula (2)

where $R^1$ is a C1 to C14 straight chain or branched alkylene group. In General Formula (2), $R^1$ may be a C1 to C14 straight chain or branched alkylene group, or a C2 to C4 straight chain or branched alkylene group. Specific examples of the repeating unit expressed by General Formula (2) encompass the following:

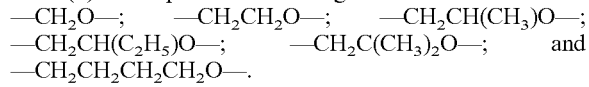

—CH$_2$O—; —CH$_2$CH$_2$O—; —CH$_2$CH(CH$_3$)O—; —CH$_2$CH(C$_2$H$_5$)O—; —CH$_2$C(CH$_3$)$_2$O—; and —CH$_2$CH$_2$CH$_2$CH$_2$O—.

The main chain skeleton of the polyether based polymer may be constituted by one type of repeating unit, or may be constituted by two or more types of repeating units. In particular, it is preferable to use a polyether based polymer made of a polymer which (i) has polypropylene glycol as a main component and (ii) has not less than 50 mass % of a propylene oxide repeating unit out of 100 mass % of the organic polymer. This is because such a polyether based polymer allows a resulting cured product to have excellent T-peel adhesive strength. Polytetramethylene glycol (PTMG) obtained by ring-opening polymerization of tetrahydrofuran is also preferable, because the PTMG allows a resulting cured product to have excellent dynamic resistance to cleavage.

The word "essentially" as used above means that, in 100 mass % of the organic polymer, the amount of the repeating unit of General Formula (2) is not less than 40 mass %. The amount of the repeating unit of General Formula (2) in 100 mass % of the organic polymer may be not less than 50 mass %, not less than 60 mass %, or not less than 70 mass %.

The blocked urethane (C) may be a compound obtained by capping a urethane prepolymer including a polyalkylene glycol structure with use of a blocking agent. The blocked urethane (C) may be a compound obtained by capping a urethane prepolymer including a polypropylene glycol structure with use of a blocking agent, in that such a compound allows a resulting curable resin composition to have a viscosity that is less thermosensitive.

A viscosity being "less thermosensitive" means that the viscosity has low temperature dependence.

Polyether Polyol and Polyether Amine

The polyether polyol is a polyether-based polymer having a hydroxy group as a terminal group. The polyether amine is a polyether based polymer having an amino group or an imino group as a terminal group.

Polyacrylic Polyol

Examples of the polyacrylic polyol encompass a polyol that (i) has an alkyl (meth)acrylate ester (co)polymer as a skeleton and (ii) has a hydroxy group in its molecule. In particular, the polyacrylic polyol may be a polyacrylic polyol obtained by copolymerizing a hydroxy-group-containing alkyl (meth)acrylate ester monomer such as 2-hydroxyethyl methacrylate.

Examples of the polyester polyol encompass a polymer obtained by polycondensation of the following substances at a temperature range of 150° C. to 270° C. in the presence of an esterification catalyst: (i) one or more selected from the group consisting of polybasic acids such as maleic acid, fumaric acid, adipic acid, and phthalic acid and acid anhydrides thereof; and (ii) one or more selected from the group consisting of polyhydric alcohols such as ethylene glycol, propylene glycol, 1,4-butanediol, 1,6-hexanediol, diethylene glycol, dipropylene glycol, and neopentyl glycol. Examples of the polyester polyol also encompass (a) polymers obtained by ring-opening polymerization of substances such as ε-caprolactone and valerolactone, and (b) an active hydrogen compound having two or more active hydrogen atoms such as polycarbonate diol and castor oil.

Polydiene Polyol

Examples of the polydiene polyol encompass polybutadiene polyol, polyisoprene polyol, and polychloroprene polyol. In particular, polybutadiene polyol is preferable.

Polyolefin Polyol

Examples of the polyolefin polyol encompass polyisobutylene polyol and hydrogenated polybutadiene polyol.

2-1-3-b. Polyisocyanate

Specific examples of the polyisocyanate compound encompass (a) aromatic polyisocyanates such as toluene (tolylene) diisocyanate, diphenylmethane diisocyanate, and xylylene diisocyanate, and (b) aliphatic polyisocyanates such as isophorone diisocyanate, hexamethylene diisocyanate, hydrogenated toluene diisocyanate, and hydrogenated diphenylmethane diisocyanate. Out of these examples, in terms of heat resistance, an aliphatic polyisocyanate is preferable, and in terms of availability, isophorone diisocyanate and hexamethylene diisocyanate are more preferable.

2-1-3-c. Blocking Agent

Examples of the blocking agent encompass a primary amine based blocking agent, a secondary amine based blocking agent, an oxime based blocking agent, a lactam based blocking agent, an active methylene based blocking agent, an alcohol based blocking agent, a mercaptan based blocking agent, an amide based blocking agent, an imide based blocking agent, a heterocyclic aromatic compound based blocking agent, a hydroxy functional (meth)acrylate based blocking agent, and a phenol based blocking agent. Out of these examples, the oxime based blocking agent, the lactam based blocking agent, the hydroxy functional (meth)acrylate based blocking agent, and the phenol based blocking agent are preferable, the hydroxy functional (meth)acrylate based blocking agent and the phenol based blocking agent are more preferable, and the phenol based blocking agent is even more preferable.

Primary Amine Based Blocking Agent

Examples of the primary amine based blocking agent encompass the various compounds disclosed in paragraph [0098] of the specification of WO 2016-163491.

Hydroxy Functional (Meth)acrylate Based Blocking Agent

The hydroxy functional (meth)acrylate based blocking agent is a (meth)acrylate having one or more hydroxy groups. Specific examples of the hydroxy functional (meth)acrylate based blocking agent encompass the various compounds disclosed in paragraph [0099] of the specification of WO 2016-163491.

Phenol Based Blocking Agent

The phenol based blocking agent includes at least one phenolic hydroxyl group, i.e., at least one hydroxyl group directly bonded to a carbon atom of an aromatic ring. The phenolic compound may have two or more phenolic hydroxyl groups, but may contain only one phenolic hydroxyl group. The phenolic compound may contain other substituents, but these substituents preferably do not react with an isocyanate group in a capping reaction and may be alkenyl groups and/or allyl groups. Examples of the other substituents include (a) alkyl groups such as straight chain alkyl, branched chain alkyl, or cycloalkyl, (b) aromatic groups (such as a phenyl group, an alkyl substituted phenyl group, and an alkenyl substituted phenyl group), (c) an aryl substituted alkyl group, and (d) a phenol substituted alkyl group. Specific examples of the phenol based blocking agent encompass the various compounds disclosed in paragraph [0100] of the specification of WO 2016-163491.

The blocking agent may be bonded to a terminus of the polymer chain of the urethane prepolymer in a state where the terminus to which the blocking agent is bonded has no reactive group.

In other words, a polymer terminus obtained by bonding of the blocking agent to the polymer chain of the urethane prepolymer may have no reactive group.

One type of blocking agent may be used alone, or two or more types may be used in combination.

The blocked urethane may contain a residue of a crosslinking agent and/or a residue of a chain extender.

Crosslinking Agent

The molecular weight of the crosslinking agent may be not more than 750 or may be 50 to 500. The crosslinking agent is a polyol or polyamine compound, each having hydroxyl group(s), amino group(s), and/or imino group(s) whose combined number is at least three per molecule. The crosslinking agent provides a branch to the blocked urethane and is useful for increasing the functional value of the blocked urethane (that is, the number of capped isocyanate groups per molecule).

Chain Extender

The molecular weight of the chain extender may be not more than 750 or may be 50 to 500. The chain extender is a polyol or polyamine compound having hydroxyl group(s), amino group(s), and/or imino group(s) whose combined number is two per molecule. The chain extender is useful for increasing the molecular weight of the blocked urethane without increasing the functional value.

Specific examples of the crosslinking agent and the chain extender encompass the various compounds disclosed in paragraph [0106] of the specification of WO 2016-163491.

Amount of Blocked Urethane (C)

The used amount of the component (C), with respect to 100 parts by mass of the component (A), may be 1 part by mass to 100 parts by mass, 2 parts by mass to 50 parts by mass, 3 parts by mass to 40 parts by mass, or 5 parts by mass to 30 parts by mass. Setting the used amount of the component (C) to be not less than 1 part by mass with respect to 100 parts by mass of the component (A) avoids the risk of a decrease in the toughness of the resulting cured product. Setting the used amount of the component (C) to be not more than 100 parts by mass with respect to 100 parts by mass of the component (A) makes it possible for the resulting cured product to have favorable heat resistance and favorable elastic modulus (rigidity).

One type of component (C) may be used alone, or two or more types may be used in combination.

2-1-4. Epoxy Resin Curing Agent (D)

In one or more embodiments of the present invention, an epoxy resin curing agent (D) can be used as necessary.

Herein, the epoxy resin curing agent (D) may also be referred to as a "component (D)".

In a case where the curable resin composition in accordance with one or more embodiments of the present invention is, for example, to be used as a single-component composition (e.g., a one-component type curable resin composition), the type and amount of the component (D) may be selected such that the adhesive agent (curable resin composition) rapidly cures once the curable resin composition is heated to a temperature of not lower than 80° C. (preferably once heated to a temperature of not lower than 140° C.). The respective types and amounts of the component (D) and the component (E) (described later) may be selected such that, at room temperature (e.g. 22° C.) and at temperatures at least up to 50° C., even if the curable resin composition does cure, the curing is extremely slow.

It is possible to used, as the component (D), a component that exhibits activity upon heating (such a component is also called a latent epoxy curing agent). As the latent epoxy curing agent, it is possible to use an N-containing curing agent, such as specific amine based curing agents (including imine based curing agents) Examples of the component (D) encompass a boron trichloride/amine complex, a boron trifluoride/amine complex, dicyandiamide, melamine, diallyl melamine, guanamine (for example, acetoguanamine and benzoguanamine), aminotriazole (for example, 3-amino-1,2,4-triazole), hydrazide (for example, adipic acid dihydrazide, stearic acid dihydrazide, isophthalic acid dihydrazide, and semicarbazide), cyanoacetamide, and aromatic polyamine (for example, meta-phenylenediamine, diaminodiphenyl methane, and diaminodiphenylsulfone). It is more preferable to use dicyandiamide, isophthalic acid dihydrazide, adipic acid dihydrazide, and/or 4,4'-diaminodiphenylsulfone as the component (D). It is particularly preferable to use dicyandiamide as the component (D).

Out of the above types of epoxy resin curing agent (D), a latent epoxy curing agent is preferable because a latent epoxy curing agent makes it possible to use the curable resin composition in accordance with one or more embodiments of the present invention as a one-component type curable resin composition.

In a case where the curable resin composition in accordance with one or more embodiments of the present invention is to be used as a two-component or multi-component composition, it is possible to select, as a component (D) that exhibits activity at comparatively low temperatures around room temperature, an amine based curing agent (including imine based curing agents) other than those above, and/or a mercaptan based curing agent (in some cases also called a room-temperature-curing curing agent).

Examples of such a component (D), which exhibits activity at comparatively low temperatures around room temperature, encompass the various compounds disclosed in paragraph [0113] of the specification of WO 2016-163491.

It is also possible to use, as the component (D), an amine-terminated polyether that (i) includes a polyether main chain and (ii) has amino groups and/or imino groups whose combined number per molecule, on average, may be 1 to 4 (or 1.5 to 3). Examples of a commercially available amine-terminated polyether encompass Jeffamine D-230, Jeffamine D-400, Jeffamine D-2000, Jeffamine D-4000, and Jeffamine T-5000, each manufactured by Huntsman.

It is also possible to use, as the component (D), an amine-terminated rubber that (i) includes a conjugated diene based polymer main chain and (ii) has amino groups and/or imino groups whose combined number per molecule, on average, may be 1 to 4 (or 1.5 to 3). The main chain of the rubber, i.e., the conjugated diene based polymer main chain may be a homopolymer or copolymer of polybutadiene, a polybutadiene/acrylonitrile copolymer, or a polybutadiene/acrylonitrile copolymer having a acrylonitrile monomer content of 5 mass % to 40 mass % (10 mass % to 35 mass %, or 15 mass % to 30 mass %). Examples of a commercially available amine-terminated rubber encompass Hypro 1300X16 ATBN manufactured by CVC.

Out of the above amine based curing agents which exhibit activity at comparatively low temperatures around room temperature, polyamide amines, amine-terminated polyether, amine-terminated rubber are more preferable, and it is particularly preferable to use a polyamide amine, amine-terminated polyether, and amine-terminated rubber in combination.

It is also possible to use e.g. acid anhydrides and phenols as the component (D). Acid anhydrides, phenols, and the like require temperatures that are higher compared to an amine based curing agent, but have a long pot life and result in a good balance of properties of the resulting cured product, such as electrical, chemical, and mechanical properties. Examples of the acid anhydrides encompass the various compounds disclosed in paragraph [0117] of the specification of WO 2016-163491.

One type of component (D) may be used alone, or two or more types may be used in combination.

The component (D) can be used in an amount sufficient to cure the composition. Typically, the component (D) can be used in an amount sufficient to consume at least 80% of the epoxide groups existing in the composition. Normally, it is not necessary to use the component (D) in a greatly excessive amount exceeding that which is necessary to consume the epoxide groups.

In one or more embodiments of the present invention, the curable resin composition may contain the epoxy resin curing agent (D) in an amount of 1 part by mass to 80 parts by mass with respect to 100 parts by mass of the epoxy resin (A).

More specifically, the used amount of the component (D), with respect to 100 parts by mass of the component (A), may be 1 part by mass to 80 parts by mass, 2 parts by mass to 40 parts by mass, 3 parts by mass to 30 parts by mass, or 5 parts by mass to 20 parts by mass. If the curable resin composition contains the epoxy resin curing agent (D) in an amount of not less than 1 part by mass with respect to 100 parts by mass of the epoxy resin (A), there is no risk of a deterioration in the curability of the curable resin composition in accordance with one or more embodiments of the present invention. If the curable resin composition contains the epoxy resin curing agent (D) in an amount of not more than 80 parts by mass with respect to 100 parts by mass of the epoxy resin (A), there are the advantages that the curable resin composition in accordance with one or more embodiments of the present invention will have favorable storage stability and be easy to handle.

2-1-5. Curing Accelerator (E)

In one or more embodiments of the present invention, a curing accelerator (E) can be used as necessary.

Herein, the curing accelerator (E) may also be referred to as a "component (E)".

The component (E) is a catalyst for promoting a reaction between (i) an epoxy group and (ii) an epoxide reactive group contained in other components of the curing agent and the adhesive agent.

Examples of the component (E) encompass: (i) ureas such as p-chlorophenyl-N,N-dimethylurea (product name: Monuron), 3-phenyl-1,1-dimethylurea (product name: Fenuron), 3,4-dichlorophenyl-N,N-dimethylurea (product name: Diuron), N-(3-chloro-4-methylphenyl)-N',N'-dimethylurea (product name: Chlortoluron), and 1,1-dimethylphenylurea (product name: Dyhard); (ii) tertiary amines such as benzyldimethylamine, 2,4,6-tris(dimethylaminomethyl)phenol, 2-(dimethylaminomethyl)phenol, 2,4,6-tris(dimethylaminomethyl)phenol incorporated into a poly(p-vinylphenol) matrix, triethylenediamine, and N,N-dimethylpiperidine; (iii) imidazoles such as C1-C12 alkyleneimidazole, N-arylimidazole, 2-methylimidazole, 2-ethyl-2-methylimidazole, N-butylimidazole, 1-cyanoethyl-2-undecyl imidazolium trimellitate, and an addition product of epoxy resin and imidazole; and (iv) 6-caprolactam. The catalyst may be encapsulated, or may be a latent catalyst that becomes active only upon a temperature increase.

Tertiary amines and imidazoles, when used in combination with the amine based curing agent of component (D), make it possible to improve the curing rate, as well as e.g. the properties and heat resistance of the resulting cured product.

One type of component (E) may be used alone, or two or more types may be used in combination.

In one or more embodiments of the present invention, the curable resin composition may contain the curing accelerator (E) in an amount of 0.1 parts by mass to 10.0 parts by mass with respect to 100 parts by mass of the epoxy resin (A).

More specifically, the used amount of the component (E), with respect to 100 parts by mass of the component (A), may be 0.1 parts by mass to 10.0 parts by mass, 0.2 parts by mass to 5.0 parts by mass, 0.5 parts by mass to 3.0 parts by mass, or 0.8 parts by mass to 2.0 parts by mass. If the curable resin composition contains the curing accelerator (E) in an amount of not less than 0.1 parts by mass with respect to 100 parts by mass of the epoxy resin (A), there is no risk of a deterioration in the curability of the curable resin composition in accordance with one or more embodiments of the present invention. If the curable resin composition contains the curing accelerator (E) in an amount of not more than 10 parts by mass with respect to 100 parts by mass of the epoxy resin (A), there are the advantages that the curable resin composition in accordance with one or more embodiments of the present invention will have favorable storage stability and be easy to handle.

2-1-6. Reinforcing Agents Other than Component (B) and Component (C)

In one or more embodiments of the present invention, a rubber-modified epoxy resin or a urethane-modified epoxy resin can be used as necessary as a reinforcing agent other than the component (B) and the component (C), in order to further improve performance of the resulting cured product such as toughness, shock resistance, shear adhesiveness, and peeling adhesiveness.

One type of reinforcing agent other than the component (B) and the component (C) may be used alone, or two or more types may be used in combination.

Examples of the rubber-modified epoxy resin encompass a resin as disclosed in paragraphs [0124] to [0132] of the specification of WO 2016-163491.

Examples of the urethane-modified epoxy resin encompass a resin as disclosed in paragraphs [0133] to [0135] of the specification of WO 2016-163491.

2-1-7. Inorganic Filler

The curable resin composition in accordance with one or more embodiments of the present invention can contain silicic acid and/or a silicate as the inorganic filler.

Specific examples encompass dry silica, wet silica, aluminum silicate, magnesium silicate, calcium silicate, wollastonite, and talc.

The dry silica is also referred to as fumed silica. Examples of the dry silica encompass non-surface treated hydrophilic fumed silica, and hydrophobic fumed silica produced by treating the silanol group part of hydrophilic fumed silica with silane and/or siloxane. The dry silica may be hydrophobic fumed silica because hydrophobic fumed silica has excellent dispersibility in the component (A).

Examples of other inorganic fillers encompass reinforcing fillers such as dolomite and carbon black, colloidal calcium carbonate, heavy calcium carbonate, magnesium carbonate, titanium oxide, ferric oxide, fine aluminum powder, zinc oxide, and active zinc oxide.

The inorganic filler may be surface treated with use of a surface treating agent. Surface treatment improves the dispersibility of the inorganic filler in a composition and, as a result, improves various properties of the resulting cured product.

The used amount of the inorganic filler, with respect to 100 parts by mass of the component (A), may be 1 part by mass to 100 parts by mass, 2 parts by mass to 70 parts by mass, 5 parts by mass to 40 parts by mass, or 7 parts by mass to 20 parts by mass.

One type of inorganic filler may be used alone, or two or more types may be used in combination.

2-1-8. Calcium Oxide

The curable resin composition in accordance with one or more embodiments of the present invention can contain calcium oxide.

Calcium oxide removes moisture from the curable resin composition by reacting with the moisture in the curable resin composition, and thereby can ameliorate moisture-caused problems regarding various properties. The calcium oxide can, for example, serve as a bubble-preventing agent by removing moisture, and prevent or reduce a decrease in the adhesive strength of the resulting cured product.

The calcium oxide can be surface treated with use of a surface treating agent. Surface treatment improves the dispersibility of the calcium oxide in a composition. As a result, using surface-treated calcium oxide, as compared to non-surface-treated calcium oxide, improves properties such as adhesive strength of the resulting cured product. In particular, surface-treated calcium oxide can markedly improve the T-peel adhesiveness and impact-peel-resistant adhesiveness of the resulting cured product. The surface treating agent that can be used in the surface treatment of the calcium oxide is not particularly limited but may be a fatty acid.

The used amount of the calcium oxide, with respect to 100 parts by mass of the component (A), may be 0.1 parts by mass to 10 parts by mass, 0.2 parts by mass to 5 parts by mass, 0.5 parts by mass to 3 parts by mass, or 1 part by mass to 2 parts by mass. Setting the used amount of the calcium oxide to be not less than 0.1 parts by mass provides a sufficient effect of moisture removal. Setting the used amount of the calcium oxide to be not more than 10 parts by mass avoids the risk of a decrease in the strength of the resulting cured product.

One type of calcium oxide may be used alone, or two or more types may be used in combination.

The curable resin composition may contain a dehydrating agent other than the calcium oxide.

Examples of the dehydrating agent other than the calcium oxide include the various compounds disclosed in paragraph [0155] of the specification of WO 2014-196607.

2-1-9. Other Components

In one or more embodiments of the present invention, other components can be used as necessary. Examples of the other components include a radically curable resin, a monoepoxide, a photopolymerization initiator, an organic filler, a pigment, a flame retardant, a dispersion agent, an anti-foaming agent, a plasticizing agent, a solvent, a tackifier, a leveling agent, a thixotropy imparting agent, an antioxidant, a photostabilizing agent, a ultraviolet ray absorbing agent, a silane coupling agent, a titanate based coupling agent, an aluminate based coupling agent, a mold releasing agent, an antistatic agent, a lubricant, a shrinkage reducing agent, an expanding agent such as an azo type chemical foaming agent and thermally expandable microballoons, fiber pulp such as aramid based pulp, and a thermoplastic resin.

Specific examples of the radically curable resin, the monoepoxide, and the photopolymerization initiator encompass the various compounds disclosed in paragraphs [0143] and [0144], paragraph [0146], and paragraph [0148], respectively, of the specification of WO 2016-163491. Specific examples of the pigment, the flame retardant, the dispersion agent, the anti-foaming agent, the plasticizing agent, the solvent, the tackifier, the leveling agent, the thixotropy imparting agent, the antioxidant, the photostabilizing agent, the ultraviolet ray absorbing agent, and the silane coupling agent encompass the various compounds disclosed in paragraph [0124], paragraphs [0126] and [0127], paragraphs [0129] and [0130], paragraph [0132], paragraph [0134], paragraph [0136], paragraph [0139], paragraph [0141], paragraph [0143], paragraph [0147], paragraph [0149], paragraph [0151], and paragraph [0153], respectively, of the specification of WO 2014-196607.

2-1-10. Temperature Dependence of Viscosity

A curable resin composition in accordance with one or more embodiments of the present invention may have a viscosity that is low in temperature dependence. A lower temperature dependence of the viscosity of the curable resin composition correlates to more excellent workability in the first adhesion method that uses the curable resin composition. The temperature dependence of the viscosity is evaluated by the ratio of viscosity at 60° C. to the viscosity at 25° C. A more specific method of measuring the viscosity is will be described later with reference to the Examples. A larger ratio of the viscosity at 60° C. to the viscosity at 25° C. (i.e., a ratio that is closer to 1) indicates a lower temperature dependence of the viscosity.

In the curable resin composition in accordance with one or more embodiments of the present invention, the ratio of the viscosity at 60° C. to the viscosity at 25° C. may be not less than 0.03, not less than 0.05, not less than 0.07, or not less than 0.10.

2-2. Method of Producing Curable Resin Composition

The curable resin composition in accordance with one or more embodiments of the present invention is a composition that includes (i) the curable resin composition whose main component is the component (A), and (ii) the fine polymer particles (B) in the curable resin composition. The curable resin composition in accordance with one or more embodiments of the present invention may be a composition in which the fine polymer particles (B) are dispersed in the form of primary particles in the component (A).

The "composition in which the fine polymer particles (B) are dispersed in the form of primary particles in the component (A)" may hereinafter also be referred to as a "fine polymer particle composition".

It is possible to use a variety of methods to obtain such a composition in which the fine polymer particles (B) are dispersed in the form of primary particles in the component (A). Examples of the methods encompass (a) a method in which fine polymer particles obtained in the form of aqueous latex are brought into contact with the component (A), and then unnecessary components such as water are removed from the resulting mixture, and (b) a method in which fine polymer particles are extracted into an organic solvent, the extracted fine polymer particles are mixed with the component (A), and then the organic solvent is removed from the resulting mixture. The method may be a method as disclosed in WO 2005/028546. Examples of specific methods of producing the fine polymer particle composition encompass a method including the following steps in the following order: (1) a first step of mixing an aqueous latex containing the fine polymer particles (B) (specifically, a reaction mixture obtained by producing fine polymer particles by emulsion polymerization) into an organic solvent whose water solubility at 20° C. is not less than 5 mass % not more than 40 mass %, and then further mixing a resultant mixture with an excess amount of water so as to agglutinate the polymer particles; (2) a second step of separating and collecting the agglutinated fine polymer particles (B) from a liquid phase, and thereafter once again mixing the fine polymer particles (B) in the organic solvent so as to obtain an organic solvent solution in which the fine polymer particles (B) are dispersed; and (3) a third step of further mixing the organic solvent solution with the component (A), and then distilling the organic solvent away from a resulting mixture. The fine polymer particle composition may be prepared via this method.

It is preferable that the component (A) is liquid at 23° C., in order to facilitate the third step. "The component (A) is liquid at 23° C." means that the component (A) has a softening point of not higher than 23° C., and that the component (A) exhibits flowability at 23° C.

The curable resin composition in accordance with one or more embodiments of the present invention, in which the fine polymer particles (B) are dispersed in the form of primary particles in the component (A), can be obtained by (i) mixing the component (C) with a composition in which the fine polymer particles (B) are dispersed in the form of primary particles in the component (A) (as obtained via a method including the above first through third steps), and (ii) as necessary, further adding and mixing the component (A), the component (C), the component (D), the component (E), and the above-described other component(s).

The fine polymer particles (B) in powder form can be obtained by using an aqueous latex containing the fine polymer particles (B), agglutinating the fine polymer particles (B) via a method such as salting out, and then drying the agglutinated matter. The resulting fine polymer particles (B) in powder form can be re-dispersed into the component (A) with use of a dispersing apparatus having a high mechanical shearing force, such as three-roll paint mill, a roller mill, or a kneader. When doing so, applying the mechanical shearing force at a high temperature to the mixture containing the component (A) and the component (B) makes it possible to efficiently disperse the component (B) into the component (A). The temperature during dispersion (i.e., the temperature when applying the shearing force) may be 50° C. to 200° C., 70° C. to 170° C., 80° C. to 150° C., or 90° C. to 120° C. Setting the temperature during dispersion to be not lower than 50° C. makes it possible to sufficiently disperse the component (B). Setting the temperature during dispersion to be not higher than 200° C. avoids the risk of thermal degradation of the component (A) and the component (B).

2-3. Uses

In one or more embodiments of the present invention, in terms of handleability, the curable resin composition may be a one-component type curable resin composition.

The composition in accordance with one or more embodiments of the present invention is useful as an adhesive agent.

2-4. One-Component Type Curable Resin Composition

The curable resin composition in accordance with one or more embodiments of the present invention can be used as a one-component type curable resin composition. The term "one-component type curable resin composition" refers to a curable resin that (i) after all components have been mixed therein, can be stored in a sealed state without curing, and (ii) is cured by heat and/or light after the curable resin composition is applied. The curable resin composition in accordance with one or more embodiments of the present invention can be used as a two-component type or multi-component type curable resin composition. In other words, it is possible to (i) prepare a liquid A that contains the component (A) as a main component and also contains the component (B), and, as necessary, the component (C), and (ii) prepare a liquid B separately from the liquid A, the liquid B containing the component (D) and/or the component (E), and also containing, as necessary, the component (B) and/or the component (C), and then mix the liquid A and the liquid B prior to use. Only at least one type of each of the liquid A and the liquid B need be prepared. A plurality of types of the liquid A and/or the liquid B may be prepared. A curable composition in accordance with one or more embodiments of the present invention has excellent storage stability and is therefore particularly advantageous when used as a one-component type curable resin composition.

The component (B) and the component (C) each need only be contained in at least one of the liquid A and the liquid B. For example, the component (B) and the component (C) may each be contained only in the liquid A or only in the liquid B, or may each be contained in both the liquid A and the liquid B.

2-5. Cured Product

One or more embodiments of the present invention include a cured product obtained by curing the curable resin composition. In the curable resin composition in accordance with one or more embodiments of the present invention, fine polymer particles are dispersed evenly in the form of primary particles in the component (A). As such, curing the curable resin composition makes it possible to easily obtain a cured product in which fine polymer particles are evenly distributed. In the curable resin composition in accordance with one or more embodiments of the present invention, because the fine polymer particles are unlikely to swell and the curable resin composition has low viscosity, it is possible to obtain, with good workability, a cured product.

It is possible to adhere a variety of adherends to each other by using the first adhesion method in accordance with one or more embodiments of the present invention. Herein, an adherend may also be referred to as a "substrate" or an "adhesion substrate".

2-6. Adhesion Substrate

When using the curable resin composition in accordance with one or more embodiments of the present invention to adhere together a variety of substrates together, it is possible to adhere, for example, wood, metal, plastic, and glass. Examples of the substrates encompass (i) steel materials such as cold-rolled steel and hot-dip galvanized steel, (ii) aluminum materials such as aluminum and coated aluminum, and (iii) various plastic based substrates such as general purpose plastic, engineering plastic, and composites such as CFRP and GFRP.

The curable resin composition in accordance with one or more embodiments of the present invention has excellent adhesiveness. As such, a laminate in which a plurality of members including an aluminum base material are adhered to each other by (i) sandwiching between the plurality of members the curable resin composition in accordance with one or more embodiments of the present invention and (ii) then curing the curable resin composition, has high adhesive strength and is therefore preferable.

The curable resin composition in accordance with one or more embodiments of the present invention has excellent toughness and is therefore suitable for adhering differing types of base materials that have differing linear expansion coefficients.

The curable resin composition in accordance with one or more embodiments of the present invention can also be used for adhesion of aerospace components, particularly exterior metal components.

2-7. Adhesion Method

The following description will discuss specific steps included in the first adhesion method in accordance with one or more embodiments of the present invention.

Step 1 (Application Method)

The step 1 is a step of applying the curable resin composition to a first adherend.

The curable resin composition in accordance with one or more embodiments of the present invention can be applied via a discretionarily chosen method.

The curable resin composition in accordance with one or more embodiments of the present invention can be applied by using an application robot and extruding the curable resin composition onto a substrate in a bead-like, monofilament-like, or swirl-like manner. It is also possible to use a mechanical application method such as using a caulking gun or some other manual application method. The composition can also be applied to a substrate with use of a jet spray method or a streaming method. Adhesion is achieved by applying the curable resin composition in accordance with one or more embodiments of the present invention to one or both substrates, bringing the substrates to be adhered into contact with each other such that the composition is between the substrates, and then curing the composition.

Note that the viscosity of the curable resin composition is not particularly limited. In a bead extrusion method, the viscosity of the curable resin composition may be approximately 150 Pas to 600 Pas at 45° C. In a swirl application method, the viscosity of the curable resin composition may be approximately 100 Pas at 45° C. In a high volume application method using a high speed flow device, the viscosity of the curable resin composition may be approximately 20 Pas to 400 Pas at 45° C.

The first temperature is not particularly limited, as long as it is higher than the second temperature. The first temperature can also be said to be a temperature of the curable resin composition when the curable resin composition is applied to a first adhesion substrate. The first temperature may be room temperature. The first temperature may be higher than room temperature.

In the present disclosure, "room temperature" refers to the ambient room temperature when the curable resin composition is applied so as to have the first thickness or when the curable resin composition is spread to the second thickness. The "room temperature" in the present disclosure may be normally 5° C. to 45° C., 10° C. to 40° C., 15° C. to 34° C., or 20° C. to 30° C.

The first temperature may be, for example, 35° C. to 80° C., 40° C. to 70° C., or 45° C. to 60° C. Setting the first temperature to be not lower than 35° C. has the advantage of lowering the viscosity of the composition and thereby facilitating application. Setting the first temperature to be not higher than 80° C. has the advantage of avoiding a risk of an increase in viscosity due to a portion of the epoxy compound beginning to react, and thereby facilitates application.

The first thickness is not particularly limited, as long as it is greater than the second thickness. The first thickness may be, for example, 0.5 mm to 10 mm, 1 mm to 7 mm, 1.5 mm to 5 mm, or 2 mm to 4 mm.

Step 2

The step 2 is a step of spreading, to a second thickness, the curable resin composition that has been applied so as to have a first thickness. The step 2 is also a step of affixing the second adherend to the first adherend.

The second temperature is not particularly limited, as long as it is lower than the first temperature. The second temperature can also be said to be an environmental temperature when the curable resin composition is spread to the second thickness. The second temperature may be room temperature.

The second temperature may be, for example, 0° C. to 34° C., 5° C. to 30° C., or 10° C. to 25° C. Setting the second temperature to be not lower than 0° C. has the advantage of lowering the viscosity of the composition and thereby facilitating the spreading to the second thickness. Setting the second temperature to be not higher than 34° C. avoids the risk of a deterioration in storage stability during long term storage of the composition.

The second thickness is not particularly limited, as long as it is less than the first thickness. The second thickness may be, for example, 0.001 mm to 5 mm, 0.01 mm to 1 mm, or 0.1 mm to 0.3 mm.

In the step 2, the specific method of spreading, to the second thickness, the curable resin composition that has been applied so as to have the first thickness is not particularly limited. Examples of the method encompass (i) a method using e.g. a spatula to spread, to the second thickness, the curable resin composition that has been applied so as to have the first thickness, and (ii) a method in which, when affixing the second adherend to the first adherend having the curable resin composition applied thereto, the two adherends are brought together with the curable resin composition sandwiched therebetween, so that the two adherends spread out, to the second thickness, the curable resin composition having been applied so as to have the first thickness.

Step 3

The step 3 is a step of curing the curable resin composition sandwiched between the two adherends that have been affixed to each other. The step 3 makes it possible to obtain a laminate in which the two adherends are adhered to each other by the curable resin composition.

Curing Temperature

A curing temperature used in the step 3 for the curable resin composition in accordance with one or more embodiments of the present invention is not particularly limited. The curing temperature in the step 3 may be 50° C. to 250° C., 80° C. to 220° C., 100° C. to 200° C., or 130° C. to 180° C.

Adhesion Method

Examples of the adhesion method in accordance with one or more embodiments of the present invention encompass a method as follows. That is, the curable resin composition in accordance with one or more embodiments of the present invention has a viscosity having low temperature dependence and has favorable workability, and is therefore suitable for an adhesion method involving (i) heating the curable resin composition to a temperature higher than room temperature and applying the curable resin composition to a first adherend, (ii) subsequently, in a room temperature environment, spreading thin the curable resin composition that has been applied, the spreading being performed prior to or simultaneously with affixation of a second adherend, and (iii) curing the curable resin composition sandwiched between the two adherends that have been affixed to each other. Note that the curable resin composition that has been applied may be spread thin in a room temperature environment either prior to or simultaneously with the affixation of the second adherend.

3. Adhesion Method (Second Adhesion Method)

An adhesion method in accordance with one or more embodiments of the present invention includes: (i) a step 1 of heating a curable resin composition to a temperature higher than a first room temperature and applying the curable resin composition to a first adherend so as to have a first thickness; (ii) a step 2 of spreading, to a second thickness, the curable resin composition that has been applied, the spreading being performed in an environment at a second room temperature, the spreading being performed prior to or simultaneously with affixing a second adherend to the first adherend; and (iii) a step 3 of curing the curable resin composition sandwiched between the two adherends that have been affixed to each other. The second thickness is less than the first thickness. The curable resin composition contains: an epoxy resin (A); fine polymer particles (B) that have a core-shell structure including a core layer and a shell layer, the shell layer having a cyano group; and blocked urethane (C), the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A). A ratio (W1/W2) of a mass (W1) of the fine polymer particles (B) to a mass (W2) of the blocked urethane (C) is 0.1 to 10.0. The contained amount of the cyano group with respect to the total mass of the shell layer of the fine polymer particles (B) is 3.5 mmol/g to 15.0 mmol/g. This adhesion method is also referred to as a second adhesion method.

By having the above configuration, the second adhesion method in accordance with one or more embodiments of the present invention provides excellent workability. A laminate obtained by the second adhesion method in accordance with one or more embodiments of the present invention has an adhesive layer (cured product) that has excellent toughness and excellent impact-peel-resistant adhesiveness In one or more embodiments of the present invention, the temperature when applying the curable resin composition to the first adherend in the step 1 so as to have the first thickness may be referred to as a "first room temperature", and the room temperature when spreading the curable resin composition that has been applied to a second thickness in the step 2 may be referred to as a "second room temperature". The first room temperature may be normally 5° C. to 45° C., 10° C. to 40° C., 15° C. to 34° C., or 20° C. to 30° C. The second room temperature may be also normally 5° C. to 45° C., 10° C. to 40° C., 15° C. to 34° C., or 20° C. to 30° C. The first room temperature and the second room temperature may be the same temperature or different temperatures.

In the adhesion method (second adhesion method) in accordance with one or more embodiments of the present invention, for matters other than those described above, the disclosures in "2. Adhesion Method (First Adhesion Method)" apply as appropriate. For example, aspects of the curable resin composition used in the second adhesion method in accordance with one or more embodiments of the present invention may be the same as the aspects of the curable resin composition discussed in "2-1. Curable Resin Composition", including preferable aspects.

4. Adhesion Method (Third Adhesion Method)

Another adhesion method in accordance with one or more embodiments of the present invention includes: (i) a step 1 of heating a curable resin composition to a first temperature and applying the curable resin composition to a first adherend so as to have a first thickness; (ii) a step 2 of spreading, to a second thickness, the curable resin composition that has been applied, the spreading being performed in an environment at a second temperature, the spreading being performed prior to or simultaneously with affixing a second adherend to the first adherend; and (iii) a step 3 of curing the curable resin composition sandwiched between the two adherends that have been affixed to each other. The first temperature is higher than the second temperature, and the second thickness is less than the first thickness. The curable resin composition contains: an epoxy resin (A); fine polymer particles (B) that have a core-shell structure including a core layer and a shell layer; and blocked urethane (C) having a latent NCO % of 0.1% to 2.9%, the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A). This adhesion method is also referred to as a third adhesion method.

By having the above configuration, the third adhesion method in accordance with one or more embodiments of the present invention provides excellent workability.

The following description will discuss in detail aspects of the third adhesion method in accordance with one or more embodiments of the present invention, but for matters other than those described below, the matters disclosed in "2. Adhesion Method (First Adhesion Method)" apply as appropriate.

The curable resin composition used in the third adhesion method in accordance with one or more embodiments of the present invention contains: an epoxy resin (A); fine polymer particles (B) that have a core-shell structure including a core layer and a shell layer; and blocked urethane (C) having a latent NCO % of 0.1% to 2.9%, the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A).

It is not clear why the viscosity of the curable resin composition has low temperature dependence in the third adhesion method in accordance with one or more embodiments of the present invention, but the reasons are surmised as follows. In the third adhesion method, the polarity of the matrix resin is controlled by blending in blocked urethane (C), which has a relatively low polarity compared to the high polarity of the epoxy resin (A). In other words, in the third adhesion method, the polarity of the matrix resin is made lower than the polarity of the particle component by blending in the blocked urethane (C), which has a relatively low polarity compared to the epoxy resin (A). When this is done, an increase in interaction between particles can be expected in the third adhesion method. It is surmised that increasing the interaction between particles makes it difficult for particles to be separated from each other even at high temperatures, and as a result, the structural viscosity is maintained even at high temperatures such that the viscosity has lower temperature dependence. However, the third adhesion method in accordance with one or more embodiments of the present embodiment is not limited to the above presumptions and expectations.

The curable resin composition in the third adhesion method contains fine polymer particles (B) that have a core-shell structure including a core layer and a shell layer, the fine polymer particles (B) being contained in an amount of 1 part by mass to 100 parts by mass with respect to 100 parts by mass of the component (A). In the third adhesion method, combining the fine polymer particles (i.e., the component (B)) with the blocked urethane (i.e., the component (C) as described later) makes it possible to obtain a curable resin composition whose viscosity has low temperature dependence.

In the third adhesion method, the fine polymer particles (B) may have a cyano group in the shell layer, or may have a shell layer with no cyano group.

In the third adhesion method, the contained amount of the cyano group in the shell layers of the component (B) with respect to the total mass of the shell layer is not particularly limited. However, in terms of the temperature dependence of the viscosity of the resulting curable resin composition and the impact strength of the cured product obtained by curing, this contained amount may be 1.0 mmol/g to 13.0 mmol/g, 1.5 mmol/g to 11.0 mmol/g, 2.0 mmol/g to 10.0 mmol/g, 2.5 mmol/g to 9.0 mmol/g, 5.0 mmol/g to 10.0 mmol/g, 5.5 mmol/g to 9.5 mmol/g, or 7.0 mmol/g to 9.0 mmol/g.

In the third adhesion method, the contained amount of the epoxy group with respect to the total mass of the shell layer of the component (B) is not particularly limited, but setting this contained amount to be 0.4 mmol/g to 5.0 mmol/g makes it possible to obtain a curable resin composition whose a viscosity has lower temperature dependence. Setting the contained amount of the epoxy group with respect to the total mass of the shell layer of the component (B) to be not less than 0.4 mmol/g results in lower temperature dependence of the viscosity of the resulting curable resin composition. Setting this contained amount to be not more than 5.0 mmol/g avoids the risk of a deterioration in the storage stability of the curable resin composition.

In the third adhesion method, it is preferable that the shell layer has an epoxy group and that the contained amount of the epoxy group with respect to the total mass of the shell layer is 0.4 mmol/g to 5.0 mmol/g. Such a configuration has the advantages of (i) making it possible to chemically bond the shell layer and the component (A), so that it is possible to maintain a favorable state of dispersion of the component (B) in the cured product and/or polymer, without agglutination of the component (B), and (ii) making it possible to obtain a curable resin composition whose viscosity has lower temperature dependence.

In the third adhesion method, the contained amount of the epoxy group with respect to the total amount of the shell layer in the component (B) may be 0.4 mmol/g to 5.0 mmol/g, 0.5 mmol/g to 4.0 mmol/g, 0.6 mmol/g to 3.5 mmol/g, 0.7 mmol/g to 3.0 mmol/g, or 0.8 mmol/g to 2.5 mmol/g, because such amounts allow a resulting curable resin composition to have a viscosity with lower temperature dependence and to have excellent storage stability.

In the third adhesion method, the shell layer may have a polymer obtained by graft polymerizing, to the core layer, a monomer component having an epoxy group. Such a configuration has the advantages of (i) allowing the component (B) to have excellent compatibility and excellent dispersibility in the curable resin composition, and (ii) making it possible to chemically bond the component (B) and the component (A), so that it is possible to maintain a favorable state of dispersion of the component (B) in the cured product and/or polymer, without agglutination of the component (B).

The curable resin composition used in the third adhesion method necessarily contains the blocked urethane (C) having a latent NCO % of 0.1% to 2.9%, in an amount of 1 part by mass to 100 parts by mass with respect to 100 parts by mass of the component (A). In the third adhesion method, combining the component (C) with the fine polymer particles (component (B)) allows the resulting curable resin composition to have (i) a viscosity having lower temperature dependence and (ii) markedly excellent workability.

In the third adhesion method, the ratio (W1/W2) of the mass (W1) of the fine polymer particles (B) to the mass (W2) of the blocked urethane (C) is not particularly limited.

In the third adhesion method, the ratio (W1/W2) of the mass (W1) of the fine polymer particles (B) to the mass (W2) of the blocked urethane (C) may be 0.1 to 10.0, 0.2 to 7.0, 1.5 to 7.0, 1.8 to 5.0, 2.0 to 4.0, or 2.5 to 3.5. The ratio W1/W2 may also be 0.2 to 5.0, 0.3 to 4.0, 0.4 to 3.0, or 0.5 to 2.0. Setting the ratio W1/W2 to be in the above ranges has the advantage of making it possible to lower the temperature dependence of the viscosity of the resulting curable resin composition. A ratio W1/W2 of not less than 1.5 has the advantage of avoiding a deterioration of the impact-peelresistant adhesiveness, at low temperatures, of the cured product obtained by curing the curable resin composition.

In the third adhesion method, setting the latent NCO % of the component (C) to be 0.1% to 2.9% makes it possible to obtain a curable resin composition whose viscosity has low temperature dependence. If the latent NCO % of the component (C) is less than 0.1%, there tends to be a deterioration in the toughness of a cured product obtained by curing the curable resin composition. If the latent NCO % of the component (C) is greater than 2.9%, there tends to be an increase in the temperature dependence of the viscosity of the resultant curable resin composition.

In the third adhesion method, in terms of the temperature dependence of the viscosity of the resulting curable resin composition and the toughness of the cured product, the latent NCO % of the component (C) may be necessarily 0.1% to 2.9%, 0.3 mmol/g to 2.8 mmol/g, 0.5 mmol/g to 2.7 mmol/g, 1.0 mmol/g to 2.5 mmol/g, or 1.5 mmol/g to 2.3 mmol/g.

5. Adhesion Method (Fourth Adhesion Method)

An adhesion method in accordance with one or more embodiments of the present invention includes: (i) a step 1 of heating a curable resin composition to a temperature higher than a first room temperature and applying the curable resin composition to a first adherend so as to have a first thickness; (ii) a step 2 of spreading, to a second thickness, the curable resin composition that has been applied, the spreading being performed in an environment at a second room temperature, the spreading being performed prior to or simultaneously with affixing a second adherend to the first adherend; and (iii) a step 3 of curing the curable resin composition sandwiched between the two adherends that have been affixed to each other. The second thickness is less than the first thickness. The curable resin composition contains: an epoxy resin (A); fine polymer particles (B) that have a core-shell structure including a core layer and a shell layer; and blocked urethane (C) having a latent NCO % of 0.1% to 2.9%, the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A). This adhesion method is also referred to as a fourth adhesion method.

By having the above configuration, the fourth adhesion method in accordance with one or more embodiments of the present invention provides excellent workability.

The disclosures in "2. Adhesion Method (First Adhesion Method)", "3. Adhesion Method (Second Adhesion Method)", and "4. Adhesion Method (Third Adhesion Method)" also apply as appropriate to the adhesion method (fourth adhesion method) in accordance with one or more embodiments of the present invention. For example, the curable resin composition used in the fourth adhesion method may be the same as the curable resin composition used in the third adhesion method.

6. Laminate

A laminate in accordance with one or more embodiments of the present invention can be obtained by using the curable resin composition in accordance with one or more embodiments of the present invention in the above adhesion methods.

A laminate in accordance with one or more embodiments of the present invention is obtained with use an adhesion method as disclosed in "2. Adhesion Method (First Adhesion Method)", "3. Adhesion Method (Second Adhesion Method)", "4. Adhesion Method (Third Adhesion Method)", or "5. Adhesion Method (Fourth Adhesion Method)". Using such a method makes it possible to obtain, with favorable workability, the laminate in accordance with one or more embodiments of the present invention. Using such a method also allows the laminate in accordance with one or more embodiments of the present invention to have high adhesive strength.

In terms of adhesive strength of the laminate, the thickness of an adhesive layer of the laminate may be 0.001 mm to 5 mm, 0.01 mm to 1 mm, or 0.1 mm to 0.3 mm.

The thickness of an adhesive layer of the laminate can be said to be the thickness of a cured product between adherends.

7. Method of Producing Laminate

A method of producing a laminate in accordance with one or more embodiments of the present invention includes, as one step, an adhesion method as disclosed in "2. Adhesion Method (First Adhesion Method)", "3. Adhesion Method (Second Adhesion Method)", "4. Adhesion Method (Third Adhesion Method)", or "5. Adhesion Method (Fourth Adhesion Method)". By including such an adhesion method, the method of producing the laminate in accordance with one or more embodiments of the present invention makes it possible to obtain, with favorable workability, a laminate. By including such a method, the method of producing the laminate in accordance with one or more embodiments of the present invention also makes it possible to provide a laminate having high adhesive strength.

The method of producing a laminate in accordance with one or more embodiments of the present invention can be suitably used for production of the laminate described in "6. Laminate". In other words, the laminate described in "6. Laminate" may be produced via the method of producing a laminate in accordance with one or more embodiments of the present invention as described here.

In the method of producing the laminate in accordance with one or more embodiments of the present invention, for matters other than those described above, the disclosures in "2. Adhesion Method (First Adhesion Method)", "3. Adhesion Method (Second Adhesion Method)", "4. Adhesion Method (Third Adhesion Method)", "5. Adhesion Method (Fourth Adhesion Method)", and "6. Laminate" apply as appropriate.

One or more embodiments of the present invention may be as follows.

{1} A method of adhesion including: (i) a step 1 of heating a curable resin composition to a first temperature and applying the curable resin composition to a first adherend so as to have a first thickness; (ii) a step 2 of spreading, to a second thickness, the curable resin composition that has been applied, the spreading being performed in an environment at a second temperature, the spreading being performed prior to or simultaneously with affixing a second adherend to the first adherend; and (iii) a step 3 of curing the curable resin composition sandwiched between the two adherends that have been affixed to each other, the first temperature being higher than the second temperature, and the second thickness being less than the first thickness, the curable resin composition containing: an epoxy resin (A); fine polymer particles (B) that have a core-shell structure including a core layer and a shell layer, the shell layer having a cyano group; and blocked urethane (C), the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A), a ratio (W1/W2) of a mass (W1) of the fine polymer particles (B) to a mass (W2) of the blocked urethane (C) being 0.1 to 10.0; a contained amount of the cyano group with respect to the total mass of the shell layer of the fine polymer particles (B) being 5.0 mmol/g to 10.0 mmol/g.

{2} The method according to {1}, wherein the blocked urethane (C) has a latent NCO % of 0.1% to 2.9%.

{3} The method according to {1} or {2}, wherein the curable resin composition further contains an epoxy resin curing agent (D) in an amount of 1 part by mass to 80 parts by mass with respect to 100 parts by mass of the epoxy resin (A).

{4} The method according to any one of {1} to {3}, wherein the curable resin composition further contains a curing accelerator (E) in an amount of 0.1 parts by mass to 10.0 parts by mass with respect to 100 parts by mass of the epoxy resin (A).

{5} The method according to any one of {1} to {4}, wherein the epoxy resin (A) is bisphenol A epoxy resin having an epoxy equivalent weight of less than 220 and/or bisphenol F epoxy resin having an epoxy equivalent weight of less than 220.

{6} The method according to any one of {1} to {5}, wherein the core layer is butadiene rubber and/or butadiene-styrene rubber.

{7} The method according to any one of {1} to {6}, wherein the shell layer has a polymer obtained by graft polymerizing, to the core layer, one or more types of monomer components selected from the group consisting of aromatic vinyl monomers, vinyl cyanide monomers, and (meth)acrylate monomers.

{8} The method according to any one of {1} to {7}, wherein the shell layer has an epoxy group.

{9} The method according to {8}, wherein a contained amount of the epoxy group with respect to the total mass of the shell layer is 0.4 mmol/g to 5.0 mmol/g.

{10} The method according to any one of {1} to {9}, wherein the shell layer has a polymer obtained by graft polymerizing, to the core layer, a monomer component having an epoxy group.

{11} The method according to any one of {1} to {10}, wherein the blocked urethane (C) is a compound obtained by capping a urethane prepolymer including a polypropylene glycol structure with use of a blocking agent.

{12} The method according to any one of {1} to {11}, wherein the first temperature is 35° C. to 80° C.

{13} The method according to any one of {1} to {12}, wherein a curing temperature in the step 3 is 50° C. to 250° C.

{14} A laminate obtained by using the method according to any one of {1} to {13}.

{15} A method of producing a laminate, including: the method of adhesion according to any one of {1} to {13}, as one step.

One or more embodiments of the present invention may also be as follows.

[1] A method of adhesion utilizing a curable resin composition, the curable resin composition containing: an epoxy resin (A); fine polymer particles (B) that have a core-shell structure in which a shell layer has a cyano group; and blocked urethane (C), the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A), a ratio (W1/W2) of a mass (W1) of the fine polymer particles (B) to a mass (W2) of the blocked urethane (C) being 0.1 to 10; a contained amount of the cyano group with respect to the total amount of the shell layer of the fine polymer particles (B) being 3.5 mmol/g to 15 mmol/g; the method involving (i) heating the curable resin composition to a temperature higher than room temperature and applying the curable resin composition to a first adherend, (ii) subsequently, in a room temperature environment, spreading thin the curable resin composition that has been applied, the spreading being performed prior to or simultaneously with affixation of a second adherend, and (iii) curing the curable resin composition sandwiched between the two adherends that have been affixed to each other.

[2] The method according to [1], further containing an epoxy curing agent (D) in an amount of 1 part by mass to 80 parts by mass with respect to 100 parts by mass of the epoxy resin (A).

[3] The method according to [1] or [2], further containing a curing accelerator (E) in an amount of 0.1 parts by mass to 10 parts by mass with respect to 100 parts by mass of the epoxy resin (A).

[4] The method according to any one of [1] to [3], wherein the epoxy resin (A) is bisphenol A epoxy resin having an epoxy equivalent weight of less than 220 and/or bisphenol F epoxy resin having an epoxy equivalent weight of less than 220.

[5] The method according to any one of [1] to [4], wherein the fine polymer particles (B) having the core-shell structure have one or more types of core layers selected from the group consisting of diene-based rubber, (meth)acrylate-based rubber, and organosiloxane-based rubber.

[6] The method according to [5], wherein the diene-based rubber is butadiene rubber and/or butadiene-styrene rubber.

[7] The method according to any one of [1] to [6], wherein the fine polymer particles (B) having the core-shell structure have a shell layer obtained by graft polymerizing, to the core layer, one or more types of monomer components selected from the group consisting of aromatic vinyl monomers, vinyl cyanide monomers, and (meth)acrylate monomers.

[8] The method according to any one of [1] to [7], wherein the fine polymer particles (B) having the core-shell structure have a shell layer having an epoxy group.

[9] The method according to any one of [1] to [8], wherein the fine polymer particles (B) having the core-shell structure have a shell layer obtained by graft polymerizing, to the core layer, a monomer component having an epoxy group.

[10] The method according to any one of [1] to [9], wherein the blocked urethane (C) is a compound obtained by capping a urethane prepolymer including a polyalkylene glycol structure with use of a blocking agent.

[11] The method according to any one of [1] to [10], wherein the blocked urethane (C) is a compound obtained by capping a urethane prepolymer including a polypropylene glycol structure with use of a blocking agent.

[12] The method according to any one of [1] to [11], wherein an application temperature used when heating the curable resin composition to the temperature higher than room temperature and applying the curable resin composition to a first adhesion substrate is 35° C. to 80° C.

[13] The method according to any one of [1] to [12], wherein a curing temperature used when curing the curable resin composition is 50° C. to 250° C.

[14] A method of adhesion which utilizes a one-component type curable resin composition according to any one of [1] to [13].

[15] A laminate obtained by using the method according to any one of [1] to [14].

[16] A method of adhesion utilizing a curable resin composition, the curable resin composition containing: an epoxy resin (A); fine polymer particles (B) that have a core-shell structure in which a shell layer has a cyano group; and blocked urethane (C), the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A),
a ratio (W1/W2) of a mass (W1) of the fine polymer particles (B) to a mass (W2) of the blocked urethane (C) being 0.1 to 10; a contained amount of the cyano group with respect to the total amount of the shell layer of the fine polymer particles (B) being 3.5 mmol/g to 15 mmol/g;
the method involving (i) heating the curable resin composition to a temperature higher than a first room temperature and applying the curable resin composition to a first adherend, (ii) subsequently, in an environment at a second room temperature, spreading thin the curable resin composition that has been applied, the spreading being performed prior to or simultaneously with affixation of a second adherend, and (iii) curing the curable resin composition sandwiched between the two adherends that have been affixed to each other.

One or more embodiments of the present invention may also be as follows.

{1} A method of adhesion including: (i) a step 1 of heating a curable resin composition to a first temperature and applying the curable resin composition to a first adherend so as to have a first thickness; (ii) a step 2 of spreading, to a second thickness, the curable resin composition that has been applied, the spreading being performed in an environment at a second temperature, the spreading being performed prior to or simultaneously with affixing a second adherend to the first adherend; and (iii) a step 3 of curing the curable resin composition sandwiched between the two adherends that have been affixed to each other, the first temperature being higher than the second temperature, and the second thickness being less than the first thickness, the curable resin composition containing: an epoxy resin (A); fine polymer particles (B) that have a core-shell structure including a core layer and a shell layer; and blocked urethane (C) having a latent NCO % of 0.1% to 2.9%, the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A).

{2} The method according to {1}, wherein a ratio (W1/W2) of a mass (W1) of the fine polymer particles (B) to a mass (W2) of the blocked urethane (C) is 0.1 to 10.0.

{3} The method according to {2}, wherein: the shell layer has an epoxy group; and a contained amount of the epoxy group with respect to the total mass of the shell layer is 0.4 mmol/g to 5.0 mmol/g.

{4} The method according to any one of {1} to {3}, wherein the curable resin composition further contains an epoxy resin curing agent (D) in an amount of 1 part by mass to 80 parts by mass with respect to 100 parts by mass of the epoxy resin (A).

{5} The method according to any one of {1} to {4}, wherein the curable resin composition further contains a curing accelerator (E) in an amount of 0.1 parts by mass to 10.0 parts by mass with respect to 100 parts by mass of the epoxy resin (A).

{6} The method according to any one of {1} to {5}, wherein the epoxy resin (A) is bisphenol A epoxy resin having an epoxy equivalent weight of less than 220 and/or bisphenol F epoxy resin having an epoxy equivalent weight of less than 220.

{7} The method according to any one of {1} to {6}, wherein the core layer is butadiene rubber and/or butadiene-styrene rubber.

{8} The method according to any one of {1} to {7}, wherein the shell layer has a polymer obtained by graft polymerizing, to the core layer, one or more types of monomer components selected from the group consisting of aromatic vinyl monomers, vinyl cyanide monomers, and (meth)acrylate monomers.

{9} The method according to any one of {1} to {8}, wherein the shell layer has a polymer obtained by graft polymerizing, to the core layer, a monomer component having an epoxy group.

{10} The method according to any one of {1} to {9}, wherein the blocked urethane (C) is a compound obtained by capping a urethane prepolymer including a polypropylene glycol structure with use of a blocking agent.

{11} The method according to any one of {1} to {10}, wherein the first temperature is 35° C. to 80° C.

{12} The method according to any one of {1} to {11}, wherein a curing temperature in the step 3 is 50° C. to 250° C.

{13} A laminate obtained by using the method according to any one of {1} to {12}.

{14} A method of producing a laminate, including: the method of adhesion according to any one of {1} to {12}, as one step.

One or more embodiments of the present invention may also be as follows.

[1] A method of adhesion utilizing a curable resin composition, the curable resin composition containing: an epoxy resin (A); fine polymer particles (B) that have a core-shell structure; and blocked urethane (C) having a latent NCO % of 0.1% to 2.9%, the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A),
the method involving (i) heating the curable resin composition to a temperature higher than room temperature and applying the curable resin composition to a first adherend, (ii) subsequently, in a room temperature environment, spreading thin the curable resin composition that has been applied, the spreading being performed prior to or simultaneously with affixation of a second adherend, and (iii) curing the curable resin composition sandwiched between the two adherends that have been affixed to each other.

[2] The method according to [1], wherein a ratio (W1/W2) of a mass (W1) of the fine polymer particles (B) to a mass (W2) of the blocked urethane (C) is 0.1 to 10.

[3] The method according to [1] or [2], wherein: the fine polymer particles (B) having the core-shell structure have a shell layer having an epoxy group; and a contained amount of the epoxy group with respect to the total amount of the shell layer is 0.4 mmol/g to 5 mmol/g.

[4] The method according to any one of [1] to [3], further containing an epoxy curing agent (D) in an amount of 1 part by mass to 80 parts by mass with respect to 100 parts by mass of the epoxy resin (A).

[5] The method according to any one of [1] to [4], further containing a curing accelerator (E) in an amount of 0.1 parts by mass to 10 parts by mass with respect to 100 parts by mass of the epoxy resin (A).

[6] The method according to any one of [1] to [5], wherein the epoxy resin (A) is bisphenol A epoxy resin having an epoxy equivalent weight of less than 220 and/or bisphenol F epoxy resin having an epoxy equivalent weight of less than 220.

[7] The method according to any one of [1] to [6], wherein the fine polymer particles (B) having the core-shell structure have one or more types of core layers selected from the group consisting of diene-based rubber, (meth)acrylate-based rubber, and organosiloxane-based rubber.

[8] The method according to [7], wherein the diene-based rubber is butadiene rubber and/or butadiene-styrene rubber.

[9] The method according to any one of [1] to [8], wherein the fine polymer particles (B) having the core-shell structure have a shell layer obtained by graft polymerizing, to the core layer, one or more types of monomer components selected from the group consisting of aromatic vinyl monomers, vinyl cyanide monomers, and (meth)acrylate monomers.

[10] The method according to any one of [1] to [9], wherein the fine polymer particles (B) having the core-shell structure have a shell layer obtained by graft polymerizing, to the core layer, a monomer component having an epoxy group.

[11] The method according to any one of [1] to [10], wherein the blocked urethane (C) is a compound obtained by capping a urethane prepolymer including a polyalkylene glycol structure with use of a blocking agent.

[12] The method according to any one of [1] to [11], wherein the blocked urethane (C) is a compound obtained by capping a urethane prepolymer including a polypropylene glycol structure with use of a blocking agent.

[13] The method according to any one of [1] to [12], wherein an application temperature used when heating the curable resin composition to the temperature higher than room temperature and applying the curable resin composition to a first adhesion substrate is 35° C. to 80° C.

[14] The method according to any one of [1] to [13], wherein a curing temperature used when curing the curable resin composition is 50° C. to 250° C.

[15] A method of adhesion which utilizes a one-component type curable resin composition according to any one of [1] to [14].

[16] A laminate obtained by using the method according to any one of [1] to [15].

[17] A method of adhesion utilizing a curable resin composition, the curable resin composition containing: an epoxy resin (A); fine polymer particles (B) that have a core-shell structure; and blocked urethane (C) having a latent NCO % of 0.1% to 2.9%, the fine polymer particles (B) being contained in an amount of 1 part by mass to 100 parts by mass with respect to 100 parts by mass of the epoxy resin (A), the blocked urethane (C) being contained in an amount of 1 part by mass to 100 parts by mass with respect to 100 parts by mass of the epoxy resin (A), the method involving (i) heating the curable resin composition to a temperature higher than a first room temperature and applying the curable resin composition to a first adherend, (ii) subsequently, in an environment at a second room temperature, spreading thin the curable resin composition that has been applied, the spreading being performed prior to or simultaneously with affixation of a second adherend, and (iii) curing the curable resin composition sandwiched between the two adherends that have been affixed to each other.

EXAMPLES

The following description will discuss one or more embodiments of the present invention in detail with reference to Examples and Comparative Examples. Note that one or more embodiments of the present invention are not limited to these examples. One or more embodiments of the present invention can be achieved by altering the following Examples as appropriate within the scope of the gist disclosed herein. One or more embodiments of the present invention also include, in their technical scope, one or more embodiments achieved by altering the following Examples. Note that in the following Examples, Comparative Examples, and tables, "parts" means "parts by mass", and "%" means "mass %"

Evaluation Methods

First, the following description will discuss methods of evaluating the curable resin compositions produced in the Examples and Comparative Examples.

[1] Measurement of Volume-Average Particle Size

The volume-average particle size (Mv) of fine polymer particles (B) dispersed in aqueous latex was measured with use of the Microtrac UPA150 (manufactured by Nikkiso Co., Ltd.). The specimen used for measurement was prepared by diluting the aqueous latex in deionized water. For each production example, when making measurements, refractive index of water and the refractive index of fine polymer particles (B) obtained in that production example were inputted, measurement time was set to 600 seconds, and the concentration of the specimen was adjusted such that the signal level fell within a range of 0.6 to 0.8.

[2] Measurement of Viscosity

For each curable resin composition obtained in the Examples and Comparative Examples, a rheometer was used to measure the viscosity at a shear rate of 5 $s^{-1}$, at both 60° C. and 25° C. A larger ratio of the viscosity at 60° C. to the viscosity at 25° C. (i.e., a ratio that is closer to 1) indicates a lower temperature dependence of the viscosity and better workability.

[3] Measurement of Dynamic Resistance to Cleavage (Impact-Peel-Resistant Adhesiveness)

For each curable resin composition obtained in Examples 1 to 4, Examples 6 to 8, Examples 10 to 12, and Comparative Examples 5 to 7, the curable resin composition was applied to two SPCC steel sheets. One steel sheet was placed on the other so as to achieve an adhesive layer thickness of 0.25 mm. Thereafter, the curable resin composition was cured at 180° C. for 60 minutes so as to obtain a laminate. For each laminate thus obtained, the dynamic resistance to cleavage (impact-peel-resistant adhesiveness) thereof was measured at 23° C. and −40° C., in conformance with ISO 11343. The results are shown in Table 1.

1. Formation of Core Layer

Production Example 1-1: Preparation of Polybutadiene Rubber Latex (R-1)

Into a 100 L pressure-resistant polymerization apparatus were introduced 200 parts by mass of deionized water, 0.03 parts by mass of tripotassium phosphate, 0.25 parts by mass of potassium dihydrogenphosphate, 0.002 parts by mass of disodium ethylenediaminetetraacetate (EDTA), 0.001 parts by mass of ferrous sulfate heptahydrate (FE), and 1.5 parts by mass of sodium dodecylbenzenesulfonate (SDS) as an emulsifying agent. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 100 parts by mass of butadiene (BD) was introduced into the pressure-resistant polymerization apparatus, and the temperature inside the pressure-resistant polymerization apparatus was raised to 45° C. Thereafter, 0.015 parts by mass of paramenthane hydroperoxide (PHP) was introduced into the pressure-resistant polymerization apparatus, and subsequently 0.04 parts by mass of sodium formaldehyde sulfoxylate (SFS) was introduced into the pressure-resistant polymerization apparatus, and polymerization was commenced. At the time 10 hours had elapsed from the start of polymerization, devolatilization was carried out under reduced pressure to remove the remaining monomer that was not used in polymerization, so as to end the polymerization. During the polymerization, PHP, EDTA, and FE were each added to the pressure-resistant polymerization apparatus in discretionarily selected amounts and discretionarily selected points in time. Through this polymerization was obtained a latex (R-1), which included a core layer (polybutadiene rubber particles) whose main component was polybutadiene rubber. The volume-average particle size of the polybutadiene rubber particles contained in the latex thus obtained was 0.10 μm.

Production Example 1-2: Preparation of Polybutadiene Rubber Latex (R-2)

Into a 100 L pressure-resistant polymerization apparatus were introduced 7 parts by mass of solid content of the polybutadiene rubber latex (R-1) obtained in Production Example 1-1, 200 parts by mass of deionized water, 0.03 parts by mass of tripotassium phosphate, 0.002 parts by mass of EDTA, and 0.001 parts by mass of FE. Next, while the materials thus introduced were stirred, gas in the pressure-resistant polymerization apparatus was replaced with nitrogen, so as to sufficiently remove oxygen from the inside of the pressure-resistant polymerization apparatus. Thereafter, 93 parts by mass of BD was introduced into the pressure-resistant polymerization apparatus, and the temperature inside the pressure-resistant polymerization apparatus was raised to 45° C. Thereafter, 0.02 parts by mass of PHP was introduced into the pressure-resistant polymerization apparatus, and subsequently 0.10 parts by mass of SFS was introduced into the pressure-resistant polymerization apparatus, and polymerization was commenced. At the time 30 hours had elapsed from the start of polymerization, devolatilization was carried out under reduced pressure to remove the remaining monomer that was not used in polymerization, so as to end the polymerization. During the polymerization, PHP, EDTA, and FE were each added to the pressure-resistant polymerization apparatus in discretionarily selected amounts and discretionarily selected points in time. Through this polymerization was obtained a latex (R-2), which included a core layer (polybutadiene rubber particles) whose main component was polybutadiene rubber. The volume-average particle size of the polybutadiene rubber particles contained in the latex thus obtained was 0.20 μm.

2. Preparation of Fine Polymer Particles (B) (Formation of Shell Layer)

Production Example 2-1: Preparation of Core-Shell Polymer Latex (L-1)

Into a glass reaction vessel were introduced 262 parts by mass of the polybutadiene rubber latex (R-2) prepared in Production Example 1-2 (including 87 parts by mass of polybutadiene rubber particles) and 57 parts by mass of deionized water. The glass reaction vessel had a thermometer, a stirrer, a reflux condenser, a nitrogen inlet, and a monomer adding device. The gas in the glass reaction vessel was replaced with nitrogen, and while doing so the materials in the glass reaction vessel were stirred at 60° C. Next, 0.004 parts by mass of EDTA, 0.001 parts by mass of FE, and 0.2 parts by mass of SFS were added into the glass reaction vessel. Thereafter, a mixture of (i) a monomer for forming the shell layer (hereinafter also referred to as "graft monomer") (5 parts by mass of styrene (ST), 6 parts by mass of acrylonitrile (AN), and 2 parts by mass of glycidyl methacrylate (GMA)) and (ii) 0.04 parts by mass of cumene hydroperoxide (CHP) was added continuously into the glass reaction vessel over 120 minutes. Thereafter, 0.04 parts by mass of CHP was added into the glass reaction vessel, and the resulting mixture in the glass reaction vessel was stirred for 2 hours so as to finish polymerization. Via the above operations was obtained an aqueous latex (L-1) containing fine polymer particles (B) (core-shell polymer). The polymerization conversion ratio of the monomer component was not less than 99%. The volume-average particle size of the core-shell polymer contained in the aqueous latex thus obtained was 0.21 μm.

Production Example 2-2: Preparation of Core-Shell Polymer Latex (L-2)

An aqueous latex (L-2) containing a core-shell polymer was obtained via the same method used in Production Example 2-1, except that, as the graft monomer, instead of using 5 parts by mass of ST, 6 parts by mass of AN, and 2 parts by mass of GMA, the following were used: 6 parts by mass of ST, 5 parts by mass of AN, and 2 parts by mass of GMA. The volume-average particle size of the core-shell polymer contained in the aqueous latex thus obtained was 0.21 μm.

Production Example 2-3: Preparation of Core-Shell Polymer Latex (L-3)

An aqueous latex (L-3) containing a core-shell polymer was obtained via the same method used in Production Example 2-1, except that, as the graft monomer, instead of using 5 parts by mass of ST, 6 parts by mass of AN, and 2 parts by mass of GMA, the following were used: 7 parts by mass of ST, 4 parts by mass of AN, and 2 parts by mass of GMA. The volume-average particle size of the core-shell polymer contained in the aqueous latex thus obtained was 0.21 μm.

Production Example 2-4: Preparation of Core-Shell Polymer Latex (L-4)

An aqueous latex (L-4) containing a core-shell polymer was obtained via the same method used in Production Example 2-1, except that, as the graft monomer, instead of using 5 parts by mass of ST, 6 parts by mass of AN, and 2 parts by mass of GMA, the following were used: 5 parts by mass of ST, 4 parts by mass of AN, and 4 parts by mass of GMA. The volume-average particle size of the core-shell polymer contained in the aqueous latex thus obtained was 0.21 μm.

Production Example 2-5: Preparation of Core-Shell Polymer Latex (L-5)

An aqueous latex (L-5) containing a core-shell polymer was obtained via the same method used in Production Example 2-1, except that, as the graft monomer, instead of using 5 parts by mass of ST, 6 parts by mass of AN, and 2 parts by mass of GMA, the following were used: 8 parts by mass of ST, 4 parts by mass of AN, and 1 part by mass of GMA. The volume-average particle size of the core-shell polymer contained in the aqueous latex thus obtained was 0.21 μm.

Production Example 2-6: Preparation of Core-Shell Polymer Latex (L-6)

An aqueous latex (L-6) containing a core-shell polymer was obtained via the same method used in Production Example 2-1, except that, as the graft monomer, instead of using 5 parts by mass of ST, 6 parts by mass of AN, and 2 parts by mass of GMA, the following were used: 8 parts by mass of ST, 3 parts by mass of AN, and 2 parts by mass of GMA. The volume-average particle size of the core-shell polymer contained in the aqueous latex thus obtained was 0.21 μm.

Production Example 2-7: Preparation of Core-Shell Polymer Latex (L-7)

An aqueous latex (L-7) containing a core-shell polymer was obtained via the same method used in Production Example 2-1, except that, as the graft monomer, instead of using 5 parts by mass of ST, 6 parts by mass of AN, and 2 parts by mass of GMA, the following were used: 9 parts by mass of ST, 2 parts by mass of AN, and 2 parts by mass of GMA. The volume-average particle size of the core-shell polymer contained in the aqueous latex thus obtained was 0.21 μm.

Production Example 2-8: Preparation of Core-Shell Polymer Latex (L-8)

An aqueous latex (L-8) containing a core-shell polymer was obtained via the same method used in Production Example 2-1, except that, as the graft monomer, instead of using 5 parts by mass of ST, 6 parts by mass of AN, and 2 parts by mass of GMA, the following were used: 3 parts by mass of methyl methacrylate (MMA), 7 parts by mass of ST, 1 part by mass of AN, and 2 parts by mass of GMA. The volume-average particle size of the core-shell polymer contained in the aqueous latex thus obtained was 0.21 μm.

Production Example 2-9: Preparation of Core-Shell Polymer Latex (L-9)

An aqueous latex (L-9) containing a core-shell polymer was obtained via the same method used in Production Example 2-1, except that, as the graft monomer, instead of using 5 parts by mass of ST, 6 parts by mass of AN, and 2 parts by mass of GMA, the following were used: 3 parts by mass of MMA, 8 parts by mass of ST, and 2 parts by mass of GMA. The volume-average particle size of the core-shell polymer contained in the aqueous latex thus obtained was 0.21 μm.

Production Example 2-10: Preparation of Core-Shell Polymer Latex (L-10)

An aqueous latex (L-10) containing a core-shell polymer was obtained via the same method used in Production Example 2-1, except that, as the graft monomer, instead of using 5 parts by mass of ST, 6 parts by mass of AN, and 2 parts by mass of GMA, the following were used: 3 parts by mass of ST, 8 parts by mass of AN, and 2 parts by mass of GMA. The volume-average particle size of the core-shell polymer contained in the aqueous latex thus obtained was 0.21 μm. The amount of AN monomer remaining in the latex (L-10) was measured by GC and found to be a large amount of not less than 5000 ppm.

Production Example 2-11: Preparation of Core-Shell Polymer Latex (L-11)

Into a glass reaction vessel were introduced 262 parts by mass of the polybutadiene rubber latex (R-2) prepared in Production Example 1-2 (including 87 parts by mass of polybutadiene rubber particles) and 57 parts by mass of deionized water. The glass reaction vessel had a thermometer, a stirrer, a reflux condenser, a nitrogen inlet, and a monomer adding device. The gas in the glass reaction vessel was replaced with nitrogen, and while doing so the materials in the glass reaction vessel were stirred at 60° C. Next, 0.004 parts by mass of EDTA, 0.001 parts by mass of FE, and 0.2 parts by mass of SFS were added into the glass reaction vessel. Thereafter, a mixture of (i) a monomer for forming the shell layer (hereinafter also referred to as "graft monomer") (5 parts by mass of styrene (ST), 2 parts by mass of acrylonitrile (AN), and 6 parts by mass of glycidyl methacrylate (GMA)) and (ii) 0.04 parts by mass of cumene hydroperoxide (CHP) was added continuously into the glass reaction vessel over 120 minutes. Thereafter, 0.04 parts by mass of CHP was added into the glass reaction vessel, and the resulting mixture in the glass reaction vessel was stirred for 2 hours so as to finish polymerization. Via the above operations was obtained an aqueous latex (L-11) containing fine polymer particles (B) (core-shell polymer). The polymerization conversion ratio of the monomer component was not less than 99%. The volume-average particle size of the core-shell polymer contained in the aqueous latex thus obtained was 0.21 μm.

Production Example 2-12: Preparation of Core-Shell Polymer Latex (L-12)

An aqueous latex (L-12) containing a core-shell polymer was obtained via the same method used in Production Example 2-11, except that, as the graft monomer, instead of using 5 parts by mass of ST, 2 parts by mass of AN, and 6 parts by mass of GMA, the following were used: 1 part by mass of methyl methacrylate (MMA), 6 parts by mass of ST, 2 parts by mass of AN, and 4 parts by mass of GMA. The volume-average particle size of the core-shell polymer contained in the aqueous latex thus obtained was 0.21 μm.

Production Example 2-13: Preparation of Core-Shell Polymer Latex (L-13)

An aqueous latex (L-13) containing a core-shell polymer was obtained via the same method used in Production Example 2-11, except that, as the graft monomer, instead of using 5 parts by mass of ST, 2 parts by mass of AN, and 6 parts by mass of GMA, the following were used: 3 parts by mass of MMA, 6 parts by mass of ST, 2 parts by mass of AN, and 2 parts by mass of GMA. The volume-average particle size of the core-shell polymer contained in the aqueous latex thus obtained was 0.21 µm.

Production Example 2-14: Preparation of Core-Shell Polymer Latex (L-14)

An aqueous latex (L-14) containing a core-shell polymer was obtained via the same method used in Production Example 2-11, except that, as the graft monomer, instead of using 5 parts by mass of ST, 2 parts by mass of AN, and 6 parts by mass of GMA, the following were used: 4 parts by mass of MMA, 6 parts by mass of ST, 2 parts by mass of AN, and 1 part by mass of GMA. The volume-average particle size of the core-shell polymer contained in the aqueous latex thus obtained was 0.21 µm.

Production Example 2-15: Preparation of Core-Shell Polymer Latex (L-15)

An aqueous latex (L-15) containing a core-shell polymer was obtained via the same method used in Production Example 2-11, except that, as the graft monomer, instead of using 5 parts by mass of ST, 2 parts by mass of AN, and 6 parts by mass of GMA, the following were used: 4.5 parts by mass of MMA, 6 parts by mass of ST, 2 parts by mass of AN, and 0.5 parts by mass of GMA. The volume-average particle size of the core-shell polymer contained in the aqueous latex thus obtained was 0.21 µm.

Production Example 2-16: Preparation of Core-Shell Polymer Latex (L-16)

An aqueous latex (L-16) containing a core-shell polymer was obtained via the same method used in Production Example 2-11, except that, as the graft monomer, instead of using 5 parts by mass of ST, 2 parts by mass of AN, and 6 parts by mass of GMA, the following were used: 5 parts by mass of MMA, 6 parts by mass of ST, 2 and parts by mass of AN. The volume-average particle size of the core-shell polymer contained in the aqueous latex thus obtained was 0.21 µm.

3. Preparation of Dispersion (M) in which Fine Polymer Particles (B) are Dispersed in Curable Resin Production Example 3-1: Preparation of Dispersion (M-1)

Into a 1 L mixing vessel at 25° C. was introduced 132 g of methyl ethyl ketone (MEK). Next, while the MEK was stirred, 132 g of the aqueous latex (L-1) containing a core-shell polymer as obtained in Production Example 2-1 (equivalent to 40 g of fine polymer particles (B)) was introduced into the mixing vessel. Once the materials in the mixing vessel had been mixed uniformly, 200 g of water was introduced into the mixing vessel at a feed rate of 80 g/min, while stirring the materials in the mixing vessel. After the water was supplied, the stirring was promptly stopped, and a slurry was obtained, the slurry consisting of an aqueous phase containing (i) an agglutinate containing fine polymer particles (B) and (ii) a small amount of organic solvent. The agglutinate was buoyant. Next, 360 g of the aqueous phase was let out from an outlet in a lower part of the mixing vessel, such that the agglutinate containing a portion of the aqueous phase remained in the mixing vessel. To the agglutinate thus obtained was added 90 g of MEK, and these were mixed uniformly so as to obtain a dispersion liquid in which the core-shell polymer was dispersed uniformly in the MEK. To this dispersion liquid was added 60 g of an epoxy resin (A-1) (which is the component (A)), and these were mixed uniformly. The epoxy resin (A-1) is described later in detail. The MEK was removed from the resultant mixture with use of a rotary evaporator. In this way, a dispersion (M-1) in which the fine polymer particles (B) were dispersed in the epoxy resin (A) was obtained.

Production Example 3-2: Preparation of Dispersion (M-2)

A dispersion (M-2) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-2) (equivalent to 40 g of fine polymer particles (B)).

Production Example 3-3: Preparation of Dispersion (M-3)

A dispersion (M-3) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-3) (equivalent to 40 g of fine polymer particles (B)).

Production Example 3-4: Preparation of Dispersion (M-4)

A dispersion (M-4) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-4) (equivalent to 40 g of fine polymer particles (B)).

Production Example 3-5: Preparation of Dispersion (M-5)

A dispersion (M-5) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-5) (equivalent to 40 g of fine polymer particles (B)).

Production Example 3-6: Preparation of Dispersion (M-6)

A dispersion (M-6) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-6) (equivalent to 40 g of fine polymer particles (B)).

Production Example 3-7: Preparation of Dispersion (M-7)

A dispersion (M-7) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-7) (equivalent to 40 g of fine polymer particles (B)).

Production Example 3-8: Preparation of Dispersion (M-8)

A dispersion (M-8) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-8) (equivalent to 40 g of fine polymer particles (B)).

Production Example 3-9: Preparation of Dispersion (M-9)

A dispersion (M-9) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-9) (equivalent to 40 g of fine polymer particles (B)).

Production Example 3-10: Preparation of Dispersion (M-10)

A dispersion (M-10) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-11) (equivalent to 40 g of fine polymer particles (B)).

Production Example 3-11: Preparation of Dispersion (M-11)

A dispersion (M-11) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-12) (equivalent to 40 g of fine polymer particles (B)).

Production Example 3-12: Preparation of Dispersion (M-12)

A dispersion (M-12) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-13) (equivalent to 40 g of fine polymer particles (B)).

Production Example 3-13: Preparation of Dispersion (M-13)

A dispersion (M-13) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-14) (equivalent to 40 g of fine polymer particles (B)).

Production Example 3-14: Preparation of Dispersion (M-14)

A dispersion (M-14) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-15) (equivalent to 40 g of fine polymer particles (B)).

Production Example 3-15: Preparation of Dispersion (M-15)

A dispersion (M-15) in which fine polymer particles were dispersed in the epoxy resin (A) was obtained via the same method used in Production Example 3-1, except that, as the aqueous latex containing the core-shell polymer, instead of using 132 g of (L-1), the following was used: 132 g of (L-16) (equivalent to 40 g of fine polymer particles (B)).

Examples 1 to 13, Comparative Examples 1 to 10

Using the formulas (compositions) indicated in Tables 1 to 4, each of the various components were weighed out and sufficiently mixed so as to obtain a curable resin composition. The results of measuring the viscosity and dynamic resistance to cleavage (impact-peel-resistant adhesiveness) of each obtained curable resin composition are indicated in Tables 1 to 4.

Examples 14 to 22, Comparative Examples 11 to 15

Using the formulas (compositions) indicated in Tables 5 to 7, each of the various components were weighed out and sufficiently mixed so as to obtain a curable resin composition. The results of measuring the viscosity of each obtained curable resin composition are indicated in Tables 5 to 7.

The following were used for various materials indicated in Tables 1 to 7.

Epoxy Resin (A):
A-1: JER828 (manufactured by Mitsubishi Chemical Corporation; bisphenol A epoxy resin which is liquid at normal temperature; epoxy equivalent weight: 184 to 194)

Dispersion (M) in Which Fine Polymer Particles (B) are Dispersed in Epoxy Resin (A):
M-1 to M-15: The dispersions obtained in Production Examples 3-1 to 3-15

Blocked Urethane (C):
C-1: QR-9466 (manufactured by ADEKA; blocked urethane; latent NCO %: 3.0%)
C-2: Takenate B-7005 (manufactured by Mitsui Chemicals; blocked urethane; latent NCO %: 2.7%)
C-3: Takenate B-7055 (manufactured by Mitsui Chemicals; blocked urethane; latent NCO %: 2.0%)
C-4: Takenate B-7010S (manufactured by Mitsui Chemicals; blocked urethane; latent NCO %: 2.3%)
C-5: Takenate B-7030 (manufactured by Mitsui Chemicals; blocked urethane; latent NCO %: 3.4%)
C-6: Takenate B-7037 (manufactured by Mitsui Chemicals; blocked urethane; latent NCO %: 3.3%)
C-7: Takenate B-7075 (manufactured by Mitsui Chemicals; blocked urethane; latent NCO %: 3.9%)

Epoxy Resin Curing Agent (D):
Dyhard 100S (manufactured by AlzChem; dicyandiamide)

Curing Accelerator (E):
Dyhard UR300 (manufactured by AlzChem; 1,1-dimethyl-3-phenylurea)

Other Components:
Heavy Calcium Carbonate:
- Whiton SB (manufactured by Shiraishi Calcium; surface non-treated heavy calcium carbonate; average particle size: 1.8 μm) 5

Colloidal Calcium Carbonate:
- Vigot-10 (manufactured by Shiraishi Kogyo; colloidal calcium carbonate that has been surface treated with fatty acid; average particle size: 0.1 μm)

Calcium Oxide:
- CML #31 (manufactured by Ohmi Chemical Industry; calcium oxide that has been surface treated with fatty acid) 10

TABLE 1

| Composition (parts by mass) | | | | | Example 1 | 2 | 3 | 4 | 5 | 6 | 7 |
|---|---|---|---|---|---|---|---|---|---|---|---|
| Component (A) | Epoxy resin | | | A-1 | 25 | 32.5 | 40 | 55 | 70 | 40 | 40 |
| Component (A) + component (B) | Dispersion (M) in which fine polymer particles (B) are dispersed in epoxy resin (A) | 8.7 (*) | 1.1 (**) | M-1 | 125 | 112.5 | 100 | 75 | 50 | | |
| | | 7.2 (*) | 1.1 (**) | M-2 | | | | | | 100 | 100 |
| | | 5.8 (*) | 1.1 (**) | M-3 | | | | | | | |
| | | 5.8 (*) | 2.2 (**) | M-4 | | | | | | | |
| | | 5.8 (*) | 0.5 (**) | M-5 | | | | | | | |
| | | 4.3 (*) | 1.1 (**) | M-6 | | | | | | | |
| | | 2.9 (*) | 1.1 (**) | M-7 | | | | | | | |
| | | 1.4 (*) | 1.1 (**) | M-8 | | | | | | | |
| | | 0 (*) | 1.1 (**) | M-9 | | | | | | | |
| Component (C) | Blocked urethane | 3.0 (***) | | C-1 | 10 | 15 | 20 | 30 | 40 | 20 | |
| | | 2.7 (***) | | C-2 | | | | | | | 20 |
| Other components | Heavy calcium carbonate | Whiton SB | | | 15 | 15 | 15 | 15 | 15 | 15 | 15 |
| | Colloidal calcium carbonate | Vigot-10 | | | | | | | | | |
| | Calcium oxide | CML#31 | | | 1.5 | 1.5 | 1.5 | 1.5 | 1.5 | 1.5 | 1.5 |
| Component (D) | Epoxy resin curing agent | Dyhard 100S | | | 7 | 7 | 7 | 7 | 7 | 7 | 7 |
| Component (E) | Curing accelerator | Dyhard UR300 | | | 1 | 1 | 1 | 1 | 1 | 1 | 1 |
| Amount of component (B) with respect to 100 parts by mass of component (A) (parts by mass) | | | | | 50 parts | 45 parts | 40 parts | 30 parts | 20 parts | 40 parts | 40 parts |
| Amount of component (C) with respect to 100 parts by mass of component (A) (parts by mass) | | | | | 10 parts | 15 parts | 20 parts | 30 parts | 40 parts | 20 parts | 20 parts |
| Amount of component (D) with respect to 100 parts by mass of component (A) (parts by mass) | | | | | 7 parts | 7 parts | 7 parts | 7 parts | 7 parts | 7 parts | 7 parts |
| Amount of component (E) with respect to 100 parts by mass of component (A) (parts by mass) | | | | | 1 part | 1 part | 1 part | 1 part | 1 part | 1 part | 1 part |
| Ratio of mass (W1) of component (B) to mass (W2) of component (C) (W1/W2) | | | | | 5 | 3 | 2 | 1 | 0.5 | 2 | 2 |
| Viscosity at 60° C. (Pa · s) | | | | | 107 | 125 | 117 | 84 | 30 | 55 | 43 |
| Viscosity at 25° C. (Pa · s) | | | | | 1500 | 1218 | 974 | 759 | 675 | 681 | 500 |
| Ratio of viscosity at 60° C. to viscosity at 25° C. | | | | | 0.071 | 0.103 | 0.120 | 0.110 | 0.045 | 0.080 | 0.086 |
| Dynamic resistance to cleavage (kN/m) <23° C.> | | | | | 39 | 42 | 38 | 48 | — | 45 | 43 |
| Dynamic resistance to cleavage (kN/m) <−40° C.> | | | | | 38 | 33 | 29 | 26 | — | 33 | 36 |

(*) Contained amount of cyano group with respect to total mass of shell layer in fine polymer particles (B) (mmol/g)
(**) Contained amount of epoxy group with respect to total mass of shell layer in fine polymerparticles (B) (mmol/g)
(***) Latent NCO % of blocked urethane (C) (%)

TABLE 2

| Composition (parts by mass) | | | | | Example 8 | 9 | 10 | 11 | 12 | 13 |
|---|---|---|---|---|---|---|---|---|---|---|
| Component (A) | Epoxy resin | | | A-1 | 40 | 55 | 40 | 40 | 40 | 55 |
| Component (A) + component (B) | Dispersion (M) in which fine polymerp articles (B) are dispersed in epoxy resin (A) | 8.7 (*) | 1.1 (**) | M-1 | | | | | | |
| | | 7.2 (*) | 1.1 (**) | M-2 | 100 | 75 | | | | |
| | | 5.8 (*) | 1.1 (**) | M-3 | | | 100 | | | 75 |
| | | 5.8 (*) | 2.2 (**) | M-4 | | | | 100 | | |
| | | 5.8 (*) | 0.5 (**) | M-5 | | | | | 100 | |
| | | 4.3 (*) | 1.1 (**) | M-6 | | | | | | |
| | | 2.9 (*) | 1.1 (**) | M-7 | | | | | | |

TABLE 2-continued

| Composition (parts by mass) | | | | Example 8 | 9 | 10 | 11 | 12 | 13 |
|---|---|---|---|---|---|---|---|---|---|
| | | 1.4 (*) | 1.1 (**) | M-8 | | | | | |
| | | 0 (*) | 1.1 (**) | M-9 | | | | | |
| Component (C) | Blocked urethane | 3.0 (***) | | C-1 | 20 | 30 | 20 | 20 | 20 | 30 |
| | | 2.7 (***) | | C-2 | | | | | | |
| Other components | Heavy calcium carbonate | Whiton SB | | | | 15 | 15 | 15 | 15 | 15 |
| | Colloidal calcium carbonate | Vigot-10 | | | 15 | | | | | |
| | Calcium oxide | CML#31 | | | 1.5 | 1.5 | 1.5 | 1.5 | 1.5 | 1.5 |
| Component (D) | Epoxy resin curing agent | Dyhard 100S | | | 7 | 7 | 7 | 7 | 7 | 7 |
| Component (E) | Curing accelerator | Dyhard UR300 | | | 1 | 1 | 1 | 1 | 1 | 1 |
| Amount of component (B) with respect to 100 parts by mass of component (A) (parts by mass) | | | | | 40 parts | 30 parts | 40 parts | 40 parts | 40 parts | 30 parts |
| Amount of component (C) with respect to 100 parts by mass of component (A) (parts by mass) | | | | | 20 parts | 30 parts | 20 parts | 20 parts | 20 parts | 30 parts |
| Amount of component (D) with respect to 100 parts by mass of component (A) (parts by mass) | | | | | 7 parts | 7 parts | 7 parts | 7 parts | 7 parts | 7 parts |
| Amount of component (E) with respect to 100 parts by mass of component (A) (parts by mass) | | | | | 1 part | 1 part | 1 part | 1 part | 1 part | 1 part |
| Ratio of mass (W1) of component (B) to mass (W2) of component (C) (W1/W2) | | | | | 2 | 1 | 2 | 2 | 2 | 1 |
| Viscosity at 60° C. (Pa · s) | | | | | 73 | 51 | 25 | 23 | 23 | 23 |
| Viscosity at 25° C. (Pa · s) | | | | | 791 | 757 | 647 | 540 | 616 | 720 |
| Ratio of viscosity at 60° C. to viscosity at 25° C. | | | | | 0.093 | 0.068 | 0.038 | 0.043 | 0.037 | 0.031 |
| Dynamic resistance to cleavage (kN/m) <23° C.> | | | | | 46 | — | 46 | 45 | 44 | — |
| Dynamic resistance to cleavage (kN/m) <-40° C.> | | | | | 33 | — | 36 | 35 | 31 | — |

(*) Contained amount of cyano group with respect to total mass of shell layer in fine polymer particles (B) (mmol/g)
(**) Contained amount of epoxy group with respect to total mass of shell layer in fine polymerparticles (B) (mmol/g)
(***) Latent NCO % of blocked urethane (C) (%)

TABLE 3

| Composition (parts by mass) | | | | | Comparative Example 1 | 2 | 3 | 4 | 5 |
|---|---|---|---|---|---|---|---|---|---|
| Component (A) | Epoxy resin | | | A-1 | 10 | 17.5 | 92.5 | 100 | 40 |
| Component (A) +component (B) | Dispersion (M) in which fine polymer particles (B) are dispersed in epoxy resin (A) | 8.7 (*) | 1.1 (**) | M-1 | 150 | 137.5 | 12.5 | 0 | |
| | | 7.2 (*) | 1.1 (**) | M-2 | | | | | |
| | | 5.8 (*) | 1.1 (**) | M-3 | | | | | |
| | | 5.8 (*) | 2.2 (**) | M-4 | | | | | |
| | | 5.8 (*) | 0.5 (**) | M-5 | | | | | |
| | | 4.3 (*) | 1.1 (**) | M-6 | | | | | 100 |
| | | 2.9 (*) | 1.1 (**) | M-7 | | | | | |
| | | 1.4 (*) | 1.1 (**) | M-8 | | | | | |
| | | 0 (*) | 1.1 (**) | M-9 | | | | | |
| Component (C) | Blocked urethane | 3.0 (***) | | C-1 | 0 | 5 | 55 | 60 | 20 |
| | | 2.7 (***) | | C-2 | | | | | |
| Other components | Heavy calcium carbonate | Whiton SB | | | 15 | 15 | 15 | 15 | 15 |
| | Colloidal calcium carbonate | Vigot-10 | | | | | | | |
| | Calcium oxide | CML#31 | | | 1.5 | 1.5 | 1.5 | 1.5 | 1.5 |
| Component (D) | Epoxy resin curing agent | Dyhard 100S | | | 7 | 7 | 7 | 7 | 7 |
| Component (E) | Curing accelerator | Dyhard UR300 | | | 1 | 1 | 1 | 1 | 1 |
| Amount of component (B) with respect to 100 parts by mass of component (A) (parts by mass) | | | | | 60 parts | 55 parts | 5 parts | — | 40 parts |
| Amount of component (C) with respect to 100 parts by mass of component (A) (parts by mass) | | | | | — | 5 parts | 55 parts | 60 parts | 20 parts |
| Amount of component (D) with respect to 100 parts by mass of component (A) (parts by mass) | | | | | 7 parts | 7 parts | 7 parts | 7 parts | 7 parts |
| Amount of component (E) with respect to 100 parts by mass of component (A) (parts by mass) | | | | | 1 part | 1 part | 1 part | 1 part | 1 part |
| Ratio of mass (W1) of component (B) to mass (W2) of component (C) (W1/W2) | | | | | — | 11 | 0.09 | 0 | 2 |
| Viscosity at 60° C. (Pa · s) | | | | | 116 | 69 | 8 | 5 | 6 |
| Viscosity at 25° C. (Pa · s) | | | | | >6000 | 2758 | 526 | 422 | 294 |

TABLE 3-continued

|  | Comparative Example | | | | |
|---|---|---|---|---|---|
| Composition (parts by mass) | 1 | 2 | 3 | 4 | 5 |
| Ratio of viscosity at 60° C. to viscosity at 25° C. | <0.020 | 0.025 | 0.015 | 0.013 | 0.019 |
| Dynamic resistance to cleavage (kN/m) <23° C.> | — | — | — | — | 49 |
| Dynamic resistance to cleavage (kN/m) <−40° C.> | — | — | — | — | 40 |

(*) Contained amount of cyano group with respect to total mass of shell layer in fine polymer particles (B) (mmol/g)
(**) Contained amount of epoxy group with respect to total mass of shell layer in fine polymerparticles (B) (mmol/g)
(***) Latent NCO % of blocked urethane (C) (%)

TABLE 4

| Composition (parts by mass) | | | | Comparative Example | | | | |
|---|---|---|---|---|---|---|---|---|
|  |  |  |  | 6 | 7 | 8 | 9 | 10 |
| Component (A) | Epoxy resin | | A-1 | 55 | 40 | 55 | 55 | 55 |
| Component (A) + component (B) | Dispersion (M) in which fine polymer particles (B) are dispersed in epoxy resin (A) | 8.7 (*) 1.1 (**) | M-1 | | | | | |
|  |  | 7.2 (*) 1.1 (**) | M-2 | | | | | |
|  |  | 5.8 (*) 1.1 (**) | M-3 | | | | | |
|  |  | 5.8 (*) 2.2 (**) | M-4 | | | | | |
|  |  | 5.8 (*) 0.5 (**) | M-5 | | | | | |
|  |  | 4.3 (*) 1.1 (**) | M-6 | 75 | | | | |
|  |  | 2.9 (*) 1.1 (**) | M-7 | | 100 | 75 | | |
|  |  | 1.4 (*) 1.1 (**) | M-8 | | | | 75 | |
|  |  | 0 (*) 1.1 (**) | M-9 | | | | | 75 |
| Component (C) | Blocked urethane | 3.0 (***) | C-1 | 30 | 20 | 30 | 30 | 30 |
|  |  | 2.7 (***) | C-2 | | | | | |
| Other components | Heavy calcium carbonate | Whiton SB | | 15 | 15 | 15 | 15 | 15 |
|  | Colloidal calcium carbonate | Vigot-10 | | | | | | |
|  | Calcium oxide | CML#31 | | 1.5 | 1.5 | 1.5 | 1.5 | 1.5 |
| Component (D) | Epoxy resin curing agent | Dyhard 100S | | 7 | 7 | 7 | 7 | 7 |
| Component (E) | Curing accelerator | Dyhard UR300 | | 1 | 1 | 1 | 1 | 1 |
| Amount of component (B) with respect to 100 parts by mass of component (A) (parts by mass) | | | | 30 parts | 40 parts | 30 parts | 30 parts | 30 parts |
| Amount of component (C) with respect to 100 parts by mass of component (A) (parts by mass) | | | | 30 parts | 20 parts | 30 parts | 30 parts | 30 parts |
| Amount of component (D) with respect to 100 parts by mass of component (A) (parts by mass) | | | | 7 parts | 7 parts | 7 parts | 7 parts | 7 parts |
| Amount of component (E) with respect to 100 parts by mass of component (A) (parts by mass) | | | | 1 part | 1 part | 1 part | 1 part | 1 part |
| Ratio of mass (W1) of component (B) to mass (W2) of component (C) (W1/W2) | | | | 1 | 2 | 1 | 1 | 1 |
| Viscosity at 60° C. (Pa · s) | | | | 6 | 5 | 10 | 12 | 14 |
| Viscosity at 25° C. (Pa · s) | | | | 283 | 296 | 815 | 811 | 925 |
| Ratio of viscosity at 60° C. to viscosity at 25° C. | | | | 0.020 | 0.017 | 0.012 | 0.015 | 0.015 |
| Dynamic resistance to cleavage (kN/m) <23° C.> | | | | 52 | 47 | — | — | — |
| Dynamic resistance to cleavage (kN/m) <−40° C.> | | | | 37 | 43 | — | — | — |

(*) Contained amount of cyano group with respect to total mass of shell layer in fine polymer particles (B) (mmol/g)
(**) Contained amount of epoxy group with respect to total mass of shell layer in fine polymerparticles (B) (mmol/g)
(***) Latent NCO % of blocked urethane (C) (%)

TABLE 5

| Composition (parts by mass) | | | | Example | | | | |
|---|---|---|---|---|---|---|---|---|
|  |  |  |  | 14 | 15 | 16 | 17 | 18 |
| Component (A) | Epoxy resin | | A-1 | 55 | 55 | 55 | 55 | 55 |
| Component (A) + component (B) | Dispersion (M) in which fine polymer particles (B) are dispersed in epoxy resin (A) | 3.2 (**) | M-10 | 75 | | | | |
|  |  | 2.2 (**) | M-11 | | 75 | 75 | | |
|  |  | 1.1 (**) | M-12 | | | | 75 | 75 |
|  |  | 0.5 (**) | M-13 | | | | | |
|  |  | 0.3 (**) | M-14 | | | | | |
|  |  | 0 (**) | M-15 | | | | | |

TABLE 5-continued

|  |  |  |  | Example | | | | |
|---|---|---|---|---|---|---|---|---|
| Composition (parts by mass) | | | | 14 | 15 | 16 | 17 | 18 |
| Component (C) | Blocked urethane | 2.0 (***) | C-3 |  | 30 |  | 30 |  |
|  |  | 2.3 (***) | C-4 |  |  |  |  | 30 |
|  |  | 2.7 (***) | C-2 | 30 |  | 30 |  |  |
|  |  | 3.4 (***) | C-5 |  |  |  |  |  |
|  |  | 3.3 (***) | C-6 |  |  |  |  |  |
|  |  | 3.9 (***) | C-7 |  |  |  |  |  |
| Other components | Heavy calcium carbonate | Whiton SB | | 15 | 15 | 15 | 15 | 15 |
|  | Calcium oxide | CML#31 | | 1.5 | 1.5 | 1.5 | 1.5 | 1.5 |
| Component (D) | Epoxy resin curing agent | Dyhard 100S | | 7 | 7 | 7 | 7 | 7 |
| Component (E) | Curing accelerator | Dyhard UR300 | | 1 | 1 | 1 | 1 | 1 |
| Amount of component (B) with respect to 100 parts by mass of component (A) (parts by mass) | | | | 30 parts | 30 parts | 30 parts | 30 parts | 30 parts |
| Amount of component (C) with respect to 100 parts by mass of component (A) (parts by mass) | | | | 30 parts | 30 parts | 30 parts | 30 parts | 30 parts |
| Amount of component (D) with respect to 100 parts by mass of component (A) (parts by mass) | | | | 7 parts | 7 parts | 7 parts | 7 parts | 7 parts |
| Amount of component (E) with respect to 100 parts by mass of component (A) (parts by mass) | | | | 1 part | 1 part | 1 part | 1 part | 1 part |
| Viscosity at 60° C. (Pa · s) | | | | 18 | 24 | 16 | 22 | 20 |
| Viscosity at 25° C. (Pa · s) | | | | 389 | 401 | 369 | 403 | 524 |
| Ratio of viscosity at 60° C. to viscosity at 25° C. | | | | 0.047 | 0.060 | 0.043 | 0.055 | 0.039 |

(**) Contained amount of epoxy group with respect to total mass of shell layer in fine polymerparticles (B) (mmol/g)
(***) Latent NCO % of blocked urethane (C) (%)

TABLE 6

|  |  |  |  | Example | | | |
|---|---|---|---|---|---|---|---|
| Composition (parts by mass) | | | | 19 | 20 | 21 | 22 |
| Component (A) | Epoxy resin | | A-1 | 55 | 55 | 55 | 55 |
| Component (A) + component (B) | Dispersion (M) in which fine polymer particles (B) are dispersed in epoxy resin (A) | 3.2 (**) | M-10 |  |  |  |  |
|  |  | 2.2 (**) | M-11 |  |  |  |  |
|  |  | 1.1 (**) | M-12 | 75 |  |  |  |
|  |  | 0.5 (**) | M-13 |  | 75 |  |  |
|  |  | 0.3 (**) | M-14 |  |  | 75 |  |
|  |  | 0 (**) | M-15 |  |  |  | 75 |
| Component (C) | Blocked urethane | 2.0 (***) | C-3 |  |  |  |  |
|  |  | 2.3 (***) | C-4 |  |  |  |  |
|  |  | 2.7 (***) | C-2 | 30 | 30 | 30 | 30 |
|  |  | 3.4 (***) | C-5 |  |  |  |  |
|  |  | 3.3 (***) | C-6 |  |  |  |  |
|  |  | 3.9 (***) | C-7 |  |  |  |  |
| Other components | Heavy calcium carbonate | Whiton SB | | 15 | 15 | 15 | 15 |
|  | Calcium oxide | CML#31 | | 1.5 | 1.5 | 1.5 | 1.5 |
| Component (D) | Epoxy resin curing agent | Dyhard 100S | | 7 | 7 | 7 | 7 |
| Component (E) | Curing accelerator | Dyhard UR300 | | 1 | 1 | 1 | 1 |
| Amount of component (B) with respect to 100 parts by mass of component (A) (parts by mass) | | | | 30 parts | 30 parts | 30 parts | 30 parts |
| Amount of component (C) with respect to 100 parts by mass of component (A) (parts by mass) | | | | 30 parts | 30 parts | 30 parts | 30 parts |
| Amount of component (D) with respect to 100 parts by mass of component (A) (parts by mass) | | | | 7 parts | 7 parts | 7 parts | 7 parts |
| Amount of component (E) with respect to 100 parts by mass of component (A) (parts by mass) | | | | 1 part | 1 part | 1 part | 1 part |
| Viscosity at 60° C. (Pa · s) | | | | 14 | 13 | 11 | 11 |
| Viscosity at 25° C. (Pa · s) | | | | 371 | 374 | 365 | 337 |
| Ratio of viscosity at 60° C. to viscosity at 25° C. | | | | 0.039 | 0.035 | 0.031 | 0.032 |

(**) Contained amount of epoxy group with respect to total mass of shell layer in fine polymerparticles (B) (mmol/g)
(***) Latent NCO % of blocked urethane (C) (%)

TABLE 7

| Composition (parts by mass) | | | | Comparative Example 11 | 12 | 13 | 14 | 15 |
|---|---|---|---|---|---|---|---|---|
| Component (A) | Epoxy resin | | A-1 | 10 | 100 | 55 | 55 | 55 |
| Component (A) + component (B) | Dispersion (M) in which fine polymer particles (B) are dispersed in epoxy resin (A) | 3.2 (**) | M-10 | | | | | |
| | | 2.2 (**) | M-11 | | | | | |
| | | 1.1 (**) | M-12 | 150 | | 75 | 75 | 75 |
| | | 0.5 (**) | M-13 | | | | | |
| | | 0.3 (**) | M-14 | | | | | |
| | | 0 (**) | M-15 | | | | | |
| Component (C) | Blocked urethane | 2.0 (***) | C-3 | | 60 | | | |
| | | 2.3 (***) | C-4 | | | | | |
| | | 2.7 (***) | C-2 | | | | | |
| | | 3.4 (***) | C-5 | | | 30 | | |
| | | 3.3 (***) | C-6 | | | | 30 | |
| | | 3.9 (***) | C-7 | | | | | 30 |
| Other components | Heavy calcium carbonate | | Whiton SB | 15 | 15 | 15 | 15 | 15 |
| | Calcium oxide | | CML#31 | 1.5 | 1.5 | 1.5 | 1.5 | 1.5 |
| Component (D) | Epoxy resin curing agent | | Dyhard 100S | 7 | 7 | 7 | 7 | 7 |
| Component (E) | Curing accelerator | | Dyhard UR300 | 1 | 1 | 1 | 1 | 1 |
| Amount of component (B) with respect to 100 parts by mass of component (A) (parts by mass) | | | | 60 parts | — | 30 parts | 30 parts | 30 parts |
| Amount of component (C) with respect to 100 parts by mass of component (A) (parts by mass) | | | | — | 60 parts | 30 parts | 30 parts | 30 parts |
| Amount of component (D) with respect to 100 parts by mass of component (A) (parts by mass) | | | | 7 parts | 7 parts | 7 parts | 7 parts | 7 parts |
| Amount of component (E) with respect to 100 parts by mass of component (A) (parts by mass) | | | | 1 part | 1 part | 1 part | 1 part | 1 part |
| Viscosity at 60° C. (Pa · s) | | | | 87 | 3 | 8 | 10 | 6 |
| Viscosity at 25° C. (Pa · s) | | | | >6000 | 222 | 499 | 547 | 544 |
| Ratio of viscosity at 60° C. to viscosity at 25° C. | | | | <0.015 | 0.015 | 0.016 | 0.018 | 0.010 |

(**) Contained amount of epoxy group with respect to total mass of shell layer in fine polymerparticles (B) (mmol/g)
(***) Latent NCO % of blocked urethane (C) (%)

From Tables 1 and 2, it can be seen that the curable resin compositions of Examples 1 to 13 have a viscosity that has low temperature dependence. These curable resin compositions, in accordance with one or more embodiments of the present invention, contain the component (A), the component (B), and the component (C), wherein the ratio of the mass of the component (B) to the mass of the component (C) is 0.1 to 10, and the contained amount of the cyano group in the shell layer of the component (B) is 5.0 mmol/g to 10.0 mmol/g.

From Tables 5 and 6, it can be seen that the curable resin compositions of Examples 14 to 22 have a viscosity that has low temperature dependence. These curable resin compositions, in accordance with one or more embodiments of the present invention, contain the component (A), the component (B), and component (C), wherein the latent NCO % of the component (C) is 0.1% to 2.9%.

Furthermore, the various compositions of Tables 1 to 7 were evaluated for workability during application, as observed when the compositions were heated to 60° C. and applied to a steel sheet. Specifically, for each curable resin composition of Tables 1 to 7, the curable resin composition was heated to 60° C., applied so as to have a thickness of 3 mm, subsequently spread thin (so as to have a thickness of 0.2 mm) on the steel sheet in a room temperature environment at 25° C. with use of a spatula. Spatula workability during this spreading was evaluated. For each curable resin composition of Tables 1 to 7, after spreading the curable resin composition thin (so as to have a thickness of 0.2 mm), another steel sheet was affixed, and curing was carried out at 180° C. for 60 minutes, so as to obtain a laminate in which the two steel sheets were adhered to each other by the composition.

In each of Examples 1 to 22, the workability during application when the curable resin composition was heated to 60° C. was favorable, with no running of the curable resin composition after application. This was because the curable resin compositions in these Examples had suitable viscosity. Furthermore, In each of Examples 1 to 22, the spatula workability of the curable resin composition at 25° C. was favorable, because the curable resin composition had a viscosity with low temperature dependence and thus had a relatively low viscosity even at 25° C.

In contrast, in each of Comparative Examples 1, 2, and 11, the curable resin composition had a very high viscosity at 25° C., which made spatula work difficult. In each of Comparative Examples 3 to 10 and Comparative Examples 12 to 15, application was difficult because the curable resin composition had low viscosity at 60° C., which caused the curable resin composition to run after being applied.

Laminates obtained by using the curable resin composition of each of Examples 1 to 4, Examples 6 to 8, and Examples 10 to 12 to adhere two steel sheets had favorable impact-peel-resistant adhesiveness.

Laminates obtained by using the curable resin compositions of each of Examples 14 to 22 to adhere two steel sheets together had favorable adhesiveness.

Thus, it was found that a curable resin composition in accordance with one or more embodiments of the present invention has excellent workability and excellent toughness (impact-peel-resistant adhesiveness) at a low temperature.

Note that the amount (parts by mass) of the component (A) in the curable resin compositions of Tables 1 to 4 is the sum of (i) the amount indicated in the "Component (A)" row, i.e., the amount of the component (A) added as epoxy resin, and (ii) the amount of the component (A) contained in the amount shown in the "Component (A)+component (B)" row, i.e., the amount of the component (A) contained in the dispersion (M) of the fine polymer particles (B). The component (B) in accordance with one or more embodiments of the present invention (in accordance with the first adhesive agent method and the second adhesion method) refers to fine polymer particles having a specific contained amount of cyano group. The component (C) in accordance with one or more embodiments of the present invention (in accordance with the third adhesive agent method the fourth adhesion method) refers to blocked urethane having a specific latent NCO %.

A curable resin composition in accordance with one or more embodiments of the present invention has a viscosity whose temperature dependence is low, and an adhesion method which uses the curable resin composition provides excellent workability. As such, an adhesion method in accordance with one or more embodiments of the present invention can be suitably applied to adhesion of steel plates, CFRP, aluminum plates, and concrete. One or more embodiments of the present invention can be suitably applied in mechanical, electrical, construction, and civil engineering fields.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed:

1. A method of adhesion comprising:
   (i) heating a curable resin composition to a first temperature and applying the curable resin composition to a first adherend so as to have a first thickness;
   (ii) spreading, to a second thickness, the curable resin composition that has been applied, wherein the spreading is performed in an environment at a second temperature, and wherein the spreading is performed prior to or simultaneously with affixing a second adherend to the first adherend; and
   (iii) curing the curable resin composition sandwiched between the first adherend and the second adherend that have been affixed to each other,
   wherein the first temperature is higher than the second temperature, and the second thickness is less than the first thickness,
   wherein the curable resin composition comprises:
      an epoxy resin (A);
      fine polymer particles (B) that have a core-shell structure including a core layer and a shell layer; and
      a blocked urethane (C) having a latent NCO % of 0.1% to 2.9%,
   wherein the fine polymer particles (B) are comprised in an amount of 1 part by mass to 100 parts by mass with respect to 100 parts by mass of the epoxy resin (A), and
   wherein the blocked urethane (C) is comprised in an amount of 1 part by mass to 100 parts by mass with respect to 100 parts by mass of the epoxy resin (A).

2. The method according to claim 1, wherein a ratio (W1/W2) of a mass (W1) of the fine polymer particles (B) to a mass (W2) of the blocked urethane (C) is 0.1 to 10.0.

3. The method according to claim 2, wherein the shell layer has an epoxy group, and wherein a contained amount of the epoxy group with respect to a total mass of the shell layer is 0.4 mmol/g to 5.0 mmol/g.

4. The method according to claim 1, wherein the curable resin composition further comprises an epoxy resin curing agent (D) in an amount of 1 part by mass to 80 parts by mass with respect to 100 parts by mass of the epoxy resin (A).

5. The method according to claim 1, wherein the curable resin composition further comprises a curing accelerator (E) in an amount of 0.1 parts by mass to 10.0 parts by mass with respect to 100 parts by mass of the epoxy resin (A).

6. The method according to claim 1, wherein the epoxy resin (A) is bisphenol A epoxy resin having an epoxy equivalent weight of less than 220 and/or bisphenol F epoxy resin having an epoxy equivalent weight of less than 220.

7. The method according to claim 1, wherein the core layer is butadiene rubber and/or butadiene-styrene rubber.

8. The method according to claim 1, wherein the shell layer has a polymer obtained by graft polymerizing, to the core layer, one or more types of monomer components selected from the group consisting of aromatic vinyl monomers, vinyl cyanide monomers, and (meth)acrylate monomers.

9. The method according to claim 1, wherein the shell layer has a polymer obtained by graft polymerizing, to the core layer, a monomer component having an epoxy group.

10. The method according to claim 1, wherein the blocked urethane (C) is a compound obtained by capping a urethane prepolymer comprising a polypropylene glycol structure with use of a blocking agent.

11. The method according to claim 1, wherein the first temperature is 35° C. to 80° C.

12. The method according to claim 1, wherein a curing temperature in the curing of the curable resin composition sandwiched between the first adherend and the second adherend that have been affixed to each other is 50° C. to 250° C.

13. A method of producing a laminate, comprising the method of adhesion according to claim 1, as one step.

* * * * *